(12) United States Patent
Sato et al.

(10) Patent No.: US 7,283,854 B2
(45) Date of Patent: Oct. 16, 2007

(54) PORTABLE TERMINAL DEVICE

(75) Inventors: Noriyoshi Sato, Yokohama (JP);
Suguru Suzuki, Chuo-ku (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 458 days.

(21) Appl. No.: 10/466,747

(22) PCT Filed: Oct. 30, 2002

(86) PCT No.: PCT/JP02/11253

§ 371 (c)(1),
(2), (4) Date: Jul. 21, 2003

(87) PCT Pub. No.: WO03/039110

PCT Pub. Date: May 8, 2003

(65) Prior Publication Data

US 2004/0048633 A1    Mar. 11, 2004

(30) Foreign Application Priority Data

Oct. 31, 2001  (JP) .............................. 2001-334593
Feb. 8, 2002   (JP) .............................. 2002-032263
Oct. 24, 2002  (JP) .............................. 2002-310119

(51) Int. Cl.
*H04M 1/00* (2006.01)

(52) U.S. Cl. ............................. 455/575.3; 455/575.1; 455/575.4; 348/333.01; 348/333.06; 348/333.11

(58) Field of Classification Search ............ 455/556.1, 455/575.1–575.4; 348/333.05, 333.06, 333.01, 348/333.11
See application file for complete search history.

(56) References Cited

U.S. PATENT DOCUMENTS

| 6,308,084 | B1 | 10/2001 | Lonka |
| 6,466,202 | B1 * | 10/2002 | Suso et al. ................. 345/169 |
| 6,766,018 | B1 * | 7/2004 | Morita ................. 379/355.09 |
| 6,909,463 | B2 * | 6/2005 | Parulski ................. 348/333.01 |

(Continued)

FOREIGN PATENT DOCUMENTS

DE          19952682         5/2000

(Continued)

OTHER PUBLICATIONS

International Search Report dated Feb. 12, 2003.

*Primary Examiner*—Duc M. Nguyen
*Assistant Examiner*—Eric J Ecenko
(74) *Attorney, Agent, or Firm*—Stevens, Davis, Miller & Mosher, LLP

(57) ABSTRACT

The foldable portable terminal apparatus with a camera includes display sections on the front side (side A) and backside (side B) of the housing. When the housing (1) is open, both the person who is taking a picture using a camera (10, 8) and the person who gets his/her picture taken can check the captured image simultaneously using the display (11, 7). When the housing (1) is closed, the image taken can be checked with the display section on the front. Images taken in the past are stored in association with telephone numbers. When a call arrives from one of the persons, ringing tone sounds and at the same time the image of the sender is displayed on the display section (11, 7).

3 Claims, 32 Drawing Sheets

U.S. PATENT DOCUMENTS 7,046,287 B2 * 5/2006 Nishino et al. ........ 348/333.06
2004/0077386 A1 * 4/2004 Nagasawa ................ 455/575.1

FOREIGN PATENT DOCUMENTS

| | | |
|---|---|---|
| EP | 0963100 | 12/1999 |
| EP | 1033857 | 9/2000 |
| GB | 2331204 | 5/1999 |
| JP | 06292195 | 10/1994 |
| JP | 10271372 | 10/1998 |
| JP | 2000270069 | 9/2000 |
| JP | 2001036790 | 2/2001 |
| JP | 2001136250 | 5/2001 |
| JP | 2001320454 | 11/2001 |
| JP | 2002185589 | 6/2002 |

* cited by examiner

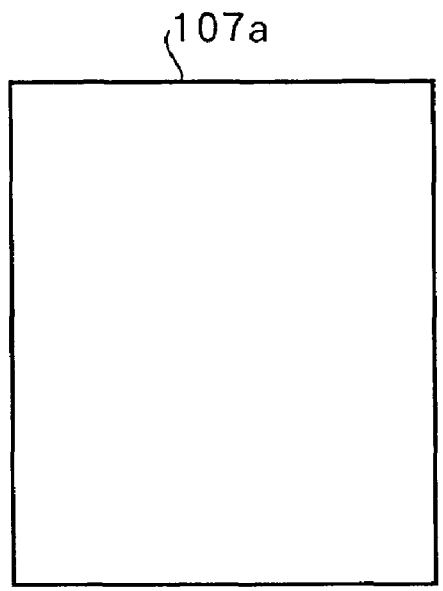
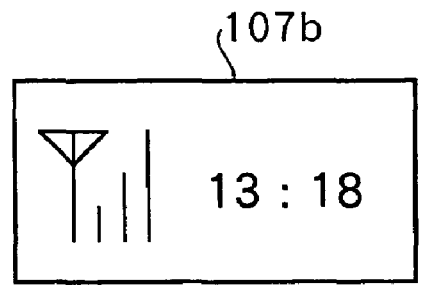
FIG.17A  FIG.17B
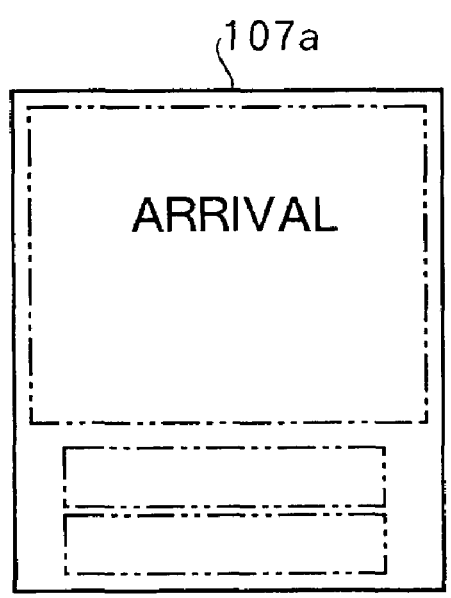
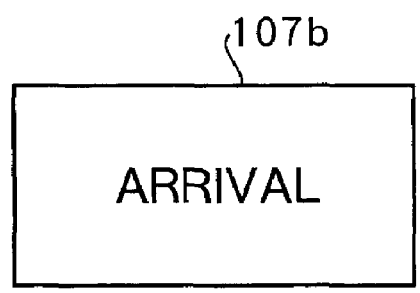
FIG.17C  FIG.17D

|  |  | CLOSED | OPEN |
|---|---|---|---|
| DISPLAY WHEN PICTURE IS TAKEN | FIRST DISPLAY SECTION |  |  |
|  | SECOND DISPLAY SECTION |  |  |

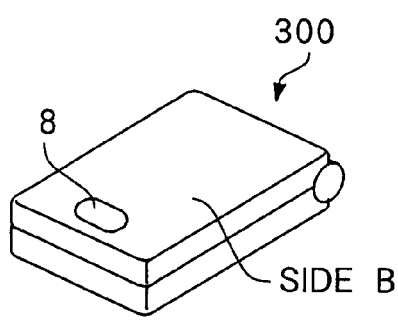
FIG.31A
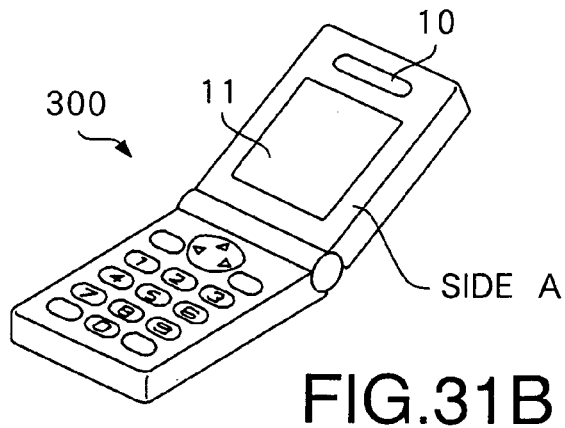
FIG.31B
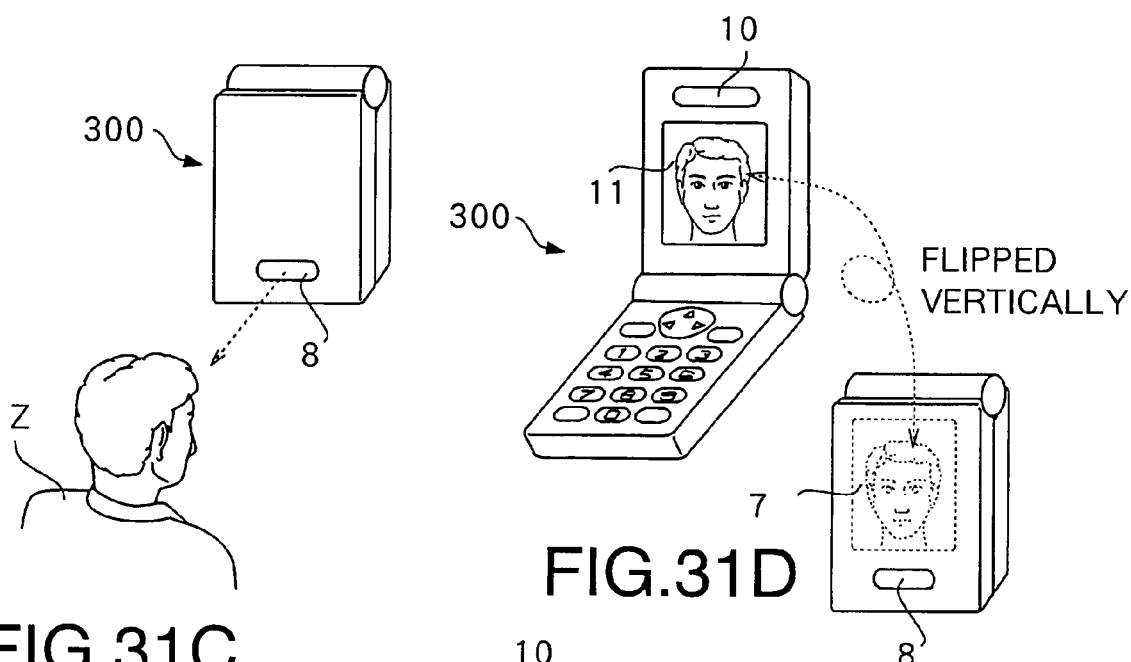
FIG.31C
FIG.31D
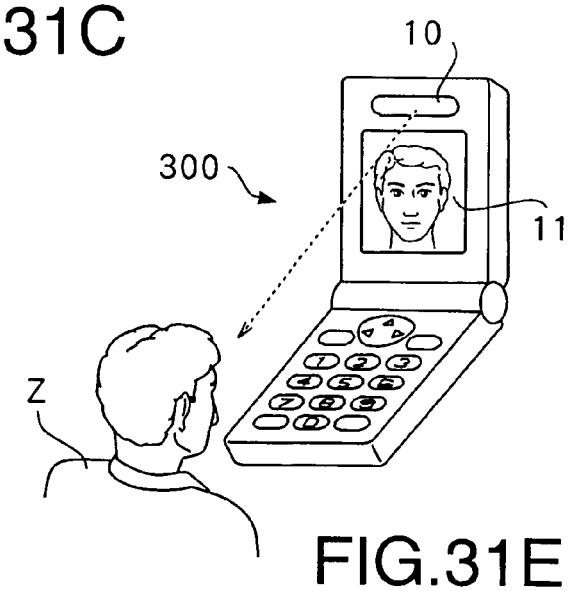
FIG.31E

PORTABLE TERMINAL DEVICE

TECHNICAL FIELD

The present invention relates to a portable terminal apparatus (cellular phone terminal, PDA digital camera, etc.) having a function of processing image information.

BACKGROUND ART

For example, a third-generation cellular phone terminal can communicate large-capacity images. This portable terminal is provided with a camera that can take pictures of scenery and people, etc., a function of transmitting/receiving images through radio communications and a display capable of displaying images.

The image processing function of a cellular phone terminal is used not only for image communications (distribution of moving images to other portable terminals, etc.) but also for playing games, for example.

A folding type cellular phone terminal (provided with a display to show two images) having a function of playing games is disclosed, for example, in the Unexamined Japanese Patent Publication No. 2001-136250.

The inventor of the present invention has studied whether the image processing function provided for a cellular phone terminal can be used for other purposes or not. That is, the inventor has studied the possibility of showing attribute information on other communication parties on the display of the cellular phone terminal upon arrival of a call.

A service of displaying a telephone number of the other party upon arrival of a call is already implemented.

If it is possible to show not only the telephone number but also a portrait of the party on the other end on the display, this will facilitate identification of the sender of a call.

However, identification of the party on the other end requires the image of the partner's face to be registered beforehand in the user's own portable terminal apparatus.

Furthermore, when the image of the face is registered, it is necessary to respect the privacy and dignity of the other party with care.

It is an object of the present invention to provide a portable terminal with a function useful to have an image of the face of the other party registered in a portable terminal so that it is shown on the display of the portable terminal upon arrival of a call while paying due respect to the privacy and dignity of the other party.

A camera-integral video camera with a monitor is described, for example, in the Unexamined Japanese Patent Publication No. HEI.10-271372.

DISCLOSURE OF INVENTION

The portable terminal of the present invention provides a display for the first side of the terminal and another display for the second side which is the back of this first side, allows both displays to show images taken by one camera and allows the images shown on the displays to be registered in association with information for identifying people (telephone numbers, names, names of companies to which they belong, etc.).

When taking a picture of a person, the present invention allows both the person who takes a picture and the person who got his/her picture taken to check the image using the display in real time. Then, after the person who got his/her picture taken authorizes the registration of his/her image (portrait) in the portable terminal, the image is registered.

Therefore, this prevents an image of one's face from being taken and registered without one's knowledge. Furthermore, it also prevents an undesired image of a person from being registered and prevents the dignity of the person from being impaired.

Upon arrival of a call, this makes it possible to use the function of the portable terminal of displaying the image of the sender without anxiety.

Upon arrival of a call, the image of the face of the sender is shown on the display of the portable terminal (cellular phone terminal), which facilitates the identification of the sender.

According to a mode of the portable terminal of the present invention, its housing is designed to be foldable.

Then, when an image being taken or an already registered image is shown on one or a plurality of displays of the portable terminal, the folding state of the housing is detected. Then, based on the detection result, the orientation of the registered image is adapted so that it is visually adequate to the person who watches the display or the registered image is converted to a mirrored image.

This eliminates the need to reverse the housing or change the position of holding the housing. Moreover, a mirrored image can also be displayed, and therefore it is also possible to use the portable terminal as a substitute for a mirror to check one's appearance.

BRIEF DESCRIPTION OF DRAWINGS

FIG. 17A illustrates an example of a first display in the other example of the portable terminal apparatus of the present invention;

FIG. 17B illustrates an example of a second display in the other example of the portable terminal apparatus of the present invention;

FIG. 17C illustrates another example of the first display in the other example of the portable terminal apparatus of the present invention;

FIG. 17D illustrates another example of the second display in the other example of the portable terminal apparatus of the present invention;

FIG. 31A is a perspective view (when the housing is closed) of the portable terminal according to a modification example of the present invention;

FIG. 31B is a perspective view (when the housing is open) of the portable terminal according to the modification example of the present invention;

FIG. 31C illustrates a case where a picture of a person is taken using the portable terminal (when the housing is closed) according to the modification example of the present invention;

FIG. 31D illustrates a case where the captured image is displayed on the display section of the portable terminal (when the housing is open) according to the modification example of the present invention;

FIG. 31E illustrates a case where a picture of a person is taken using the portable terminal (when the housing is open) according to the modification example of the present invention;

BEST MODE FOR CARRYING OUT THE INVENTION

With reference now to the attached drawings, embodiments of the present invention will be explained below.

(Embodiment 1)

A case where a cellular phone terminal is used as an example of a portable terminal will be explained below.

Figure 1B:
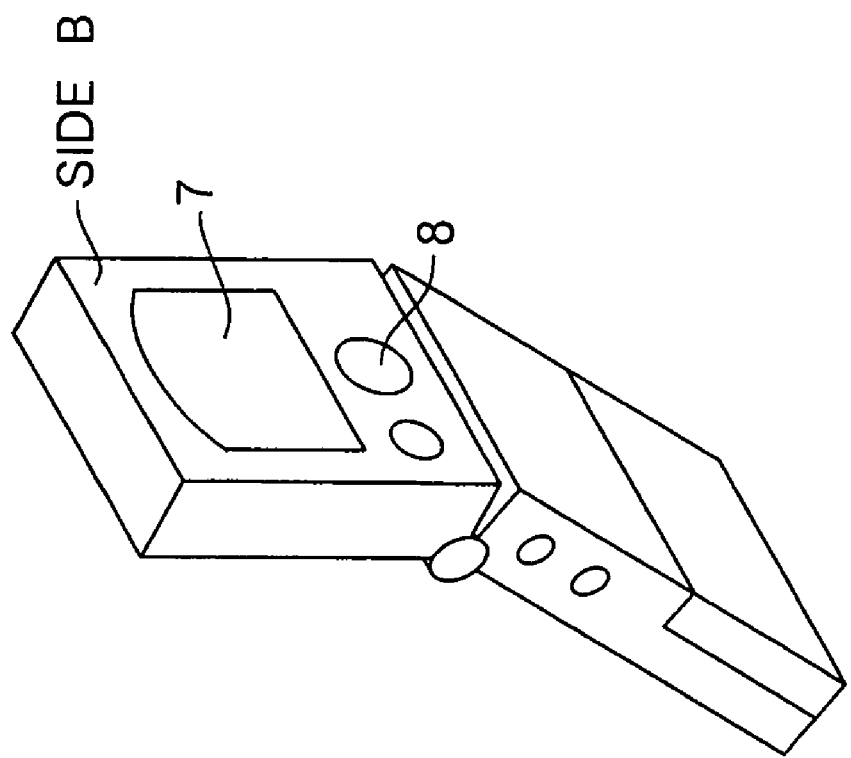
FIG. 1B is a perspective view seen from another direction of the portable terminal (cellular phone terminal) of the present invention.
Figure 1A:
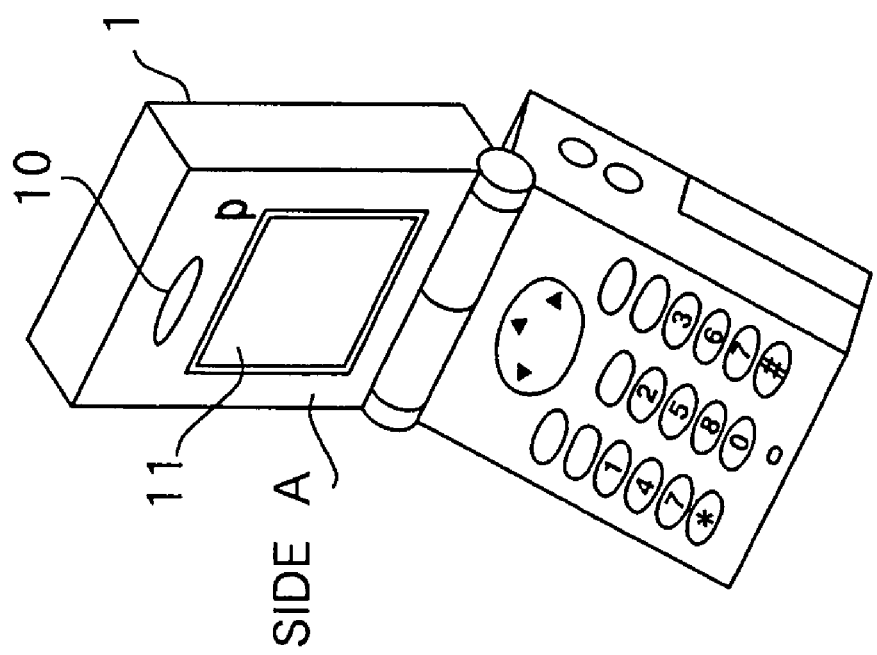
FIG. 1A is a perspective view seen from one direction of a portable terminal (cellular phone terminal) of the present invention.

As shown in FIG. 1A and FIG. 1B, the cellular phone terminal of this embodiment has a foldable housing (hereinafter also referred to as "housing") 1.

On a side A (main side) of the upper section of the housing 1 are a camera 10 and a display 11. Likewise, on a plane B (back) of the upper section of the housing 1 are a camera 8 and a display 7.

An image taken by the camera 8 or the camera 10 can be displayed in real time on both the display 11 and display 7.

Here, suppose a case where a man X takes a picture of the face of a man Y and registers it in an image memory in the own cellular phone terminal.

Figure 2B:
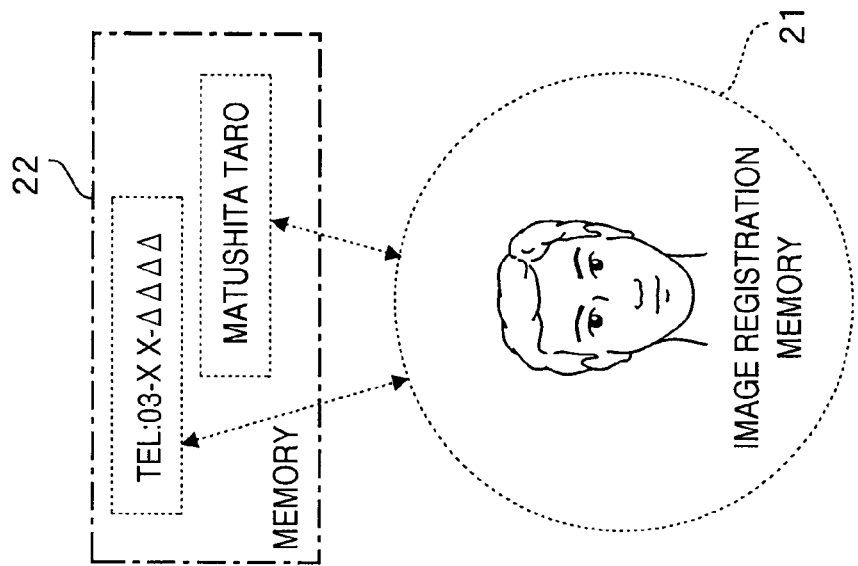
FIG. 2B illustrates a situation in which a person's attribute information is registered in association with an image taken.
Figure 2A:
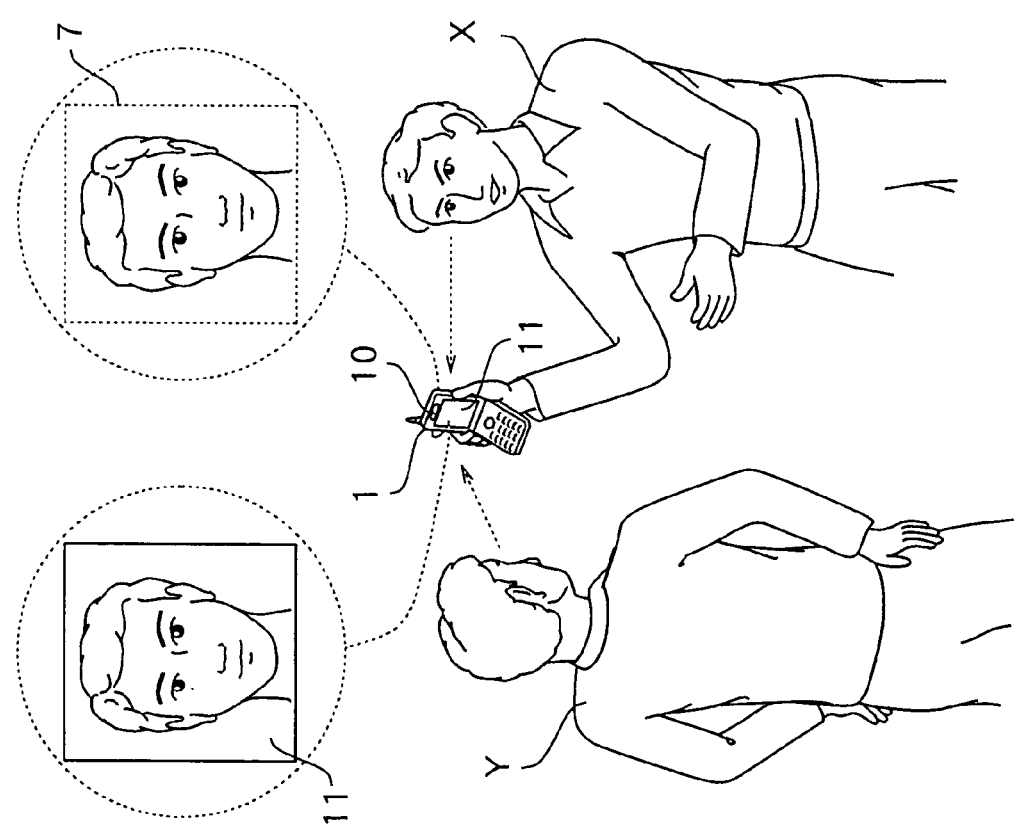
FIG. 2A illustrates the processing of registering an image of a man Y in a portable terminal (cellular phone terminal) owned by a man X.

As shown in FIG. 2A, with permission from the man Y, the man X takes a picture of the face of the man Y using the camera 10.

The image of the face of the man Y is shown on both the display 11 and display 7. The man Y who gets his picture taken can check the image of the own face through the display 11. The man X who takes the picture can check the face of the man Y through the display 7.

What should be noted here is that the image displayed on the display 11 is a mirrored image (image flipped horizontally) so that it becomes a normal image when seen from the man Y and the image is shown on the display 7 as a normal image so that it becomes a normal image when seen from the man X.

Thus, the cellular phone terminal of the present invention can show a picture taken of a person on a plurality of displays simultaneously. Moreover, each display shows an image which is automatically flipped horizontally or vertically so that the image appears correct to the viewer. This allows the owner of the cellular phone terminal and the person who gets his/her picture taken to check the common image simultaneously.

When the man Y agrees to the registration of the image taken, the man X operates a registration key (not shown) provided for the housing 1.

This causes the image of the face of the man Y (still image) to be registered in an image registration memory 21 which is built in the housing 1.

The image of the face of the man Y registered in this image registration memory 21 is associated with attribute information (telephone number, name, etc.) registered in a memory 22.

Figure 3:
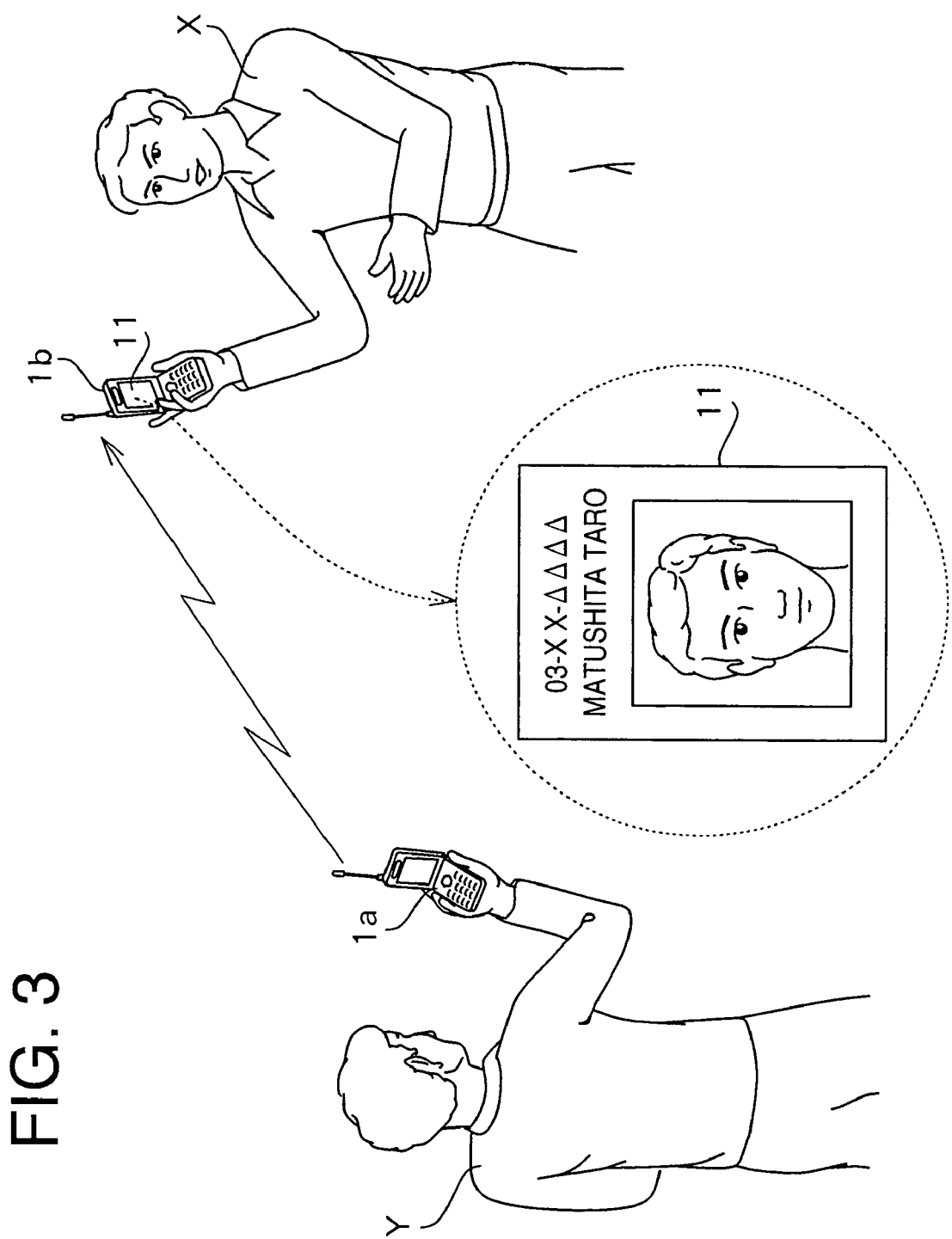
FIG. 3 illustrates a situation in which the man Y sender) is making a phone call to the man X (receiver) sing a cellular phone.

As shown in FIG. 3, suppose a case where the man Y makes a phone call to a cellular phone terminal 1b of the man X using a cellular phone terminal 1a.

When the cellular phone terminal 1b is in a position to receive the incoming call, it checks whether the telephone number memory 22 in FIG. 2B has the telephone number that matches the sender's telephone number registered or not.

When the matched telephone number is already registered, the image of the face corresponding to the telephone number is read from the image registration memory 21 in FIG. 2B. Then, the read image information of the face is shown on the display 11 (can also be the display 7) of the cellular phone terminal 1b together with attribute information (telephone number and name).

This allows the man X to correctly recognize that the sender is the man Y.

The cellular phone terminal of the present invention is provided with a plurality of displays and each display can show normal images.

Figure 4:
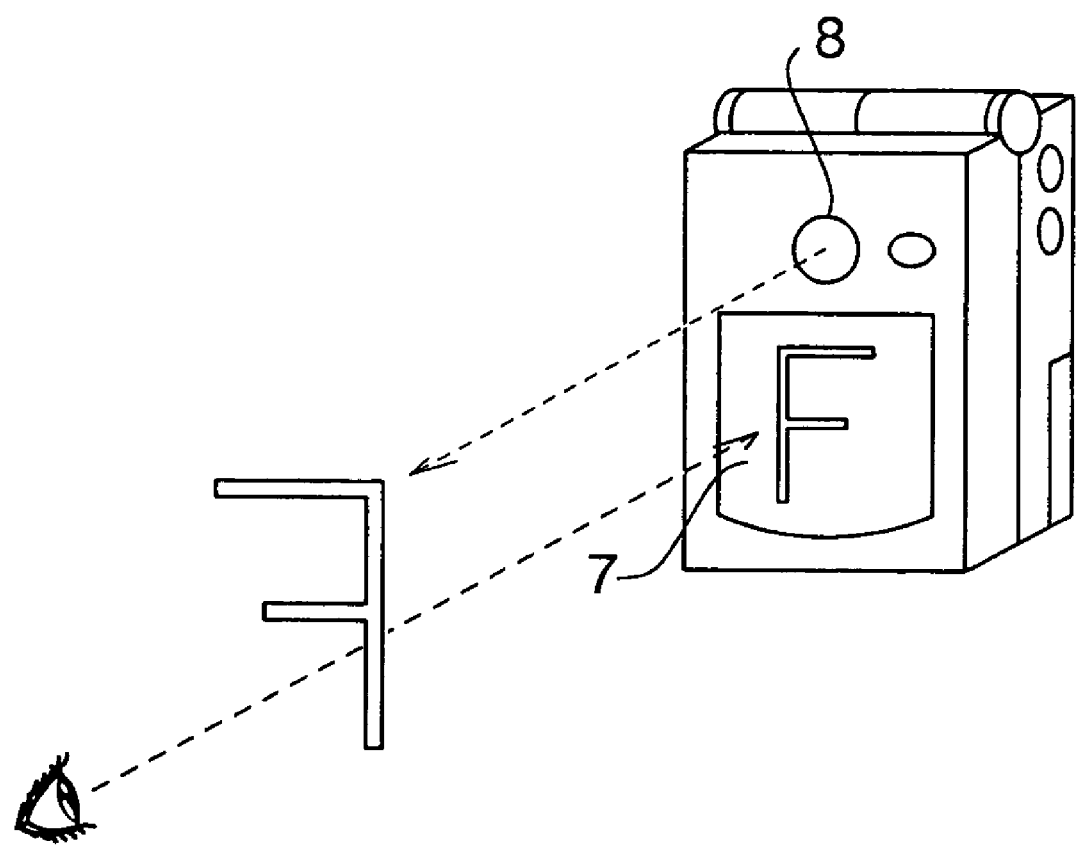
FIG. 4 illustrates a situation in which a picture of an object is taken using a camera and the image taken is shown as a mirrored image on the display while the portable terminal (cellular phone terminal) of the present invention is folded.

When this function of the cellular phone terminal of the present invention is used, a normal image can be displayed on the display even if the cellular phone is folded as shown in FIG. 4.

In FIG. 4, a character "F" is captured using the cellular phone terminal of the present invention when it is folded.

This captured image is shown on the display 7 as a mirrored image which has been flipped horizontally. That is, a visually adequate image is shown on the display 7.

Figure 5:
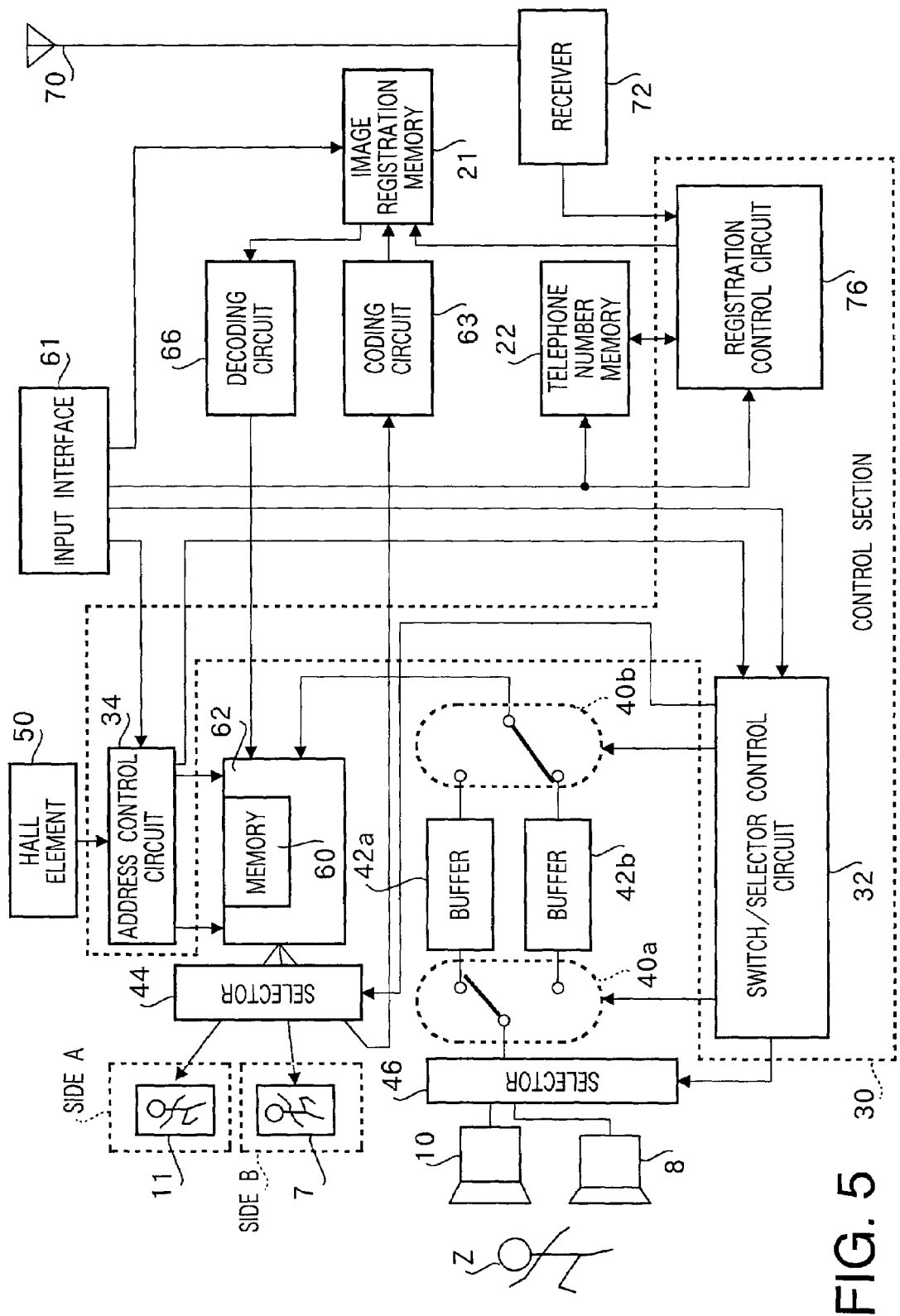
FIG. 5 illustrates an example of an internal configuration of a portable terminal (cellular phone terminal) of the present invention.

FIG. 5 is a block diagram showing an internal configuration example of the cellular phone terminal of the present invention shown in FIG. 1A and FIG. 1B.

The cellular phone terminal has two cameras 8 and 10. A selector 46 selects either an image taken by the camera 8 or an image taken by the camera 10.

A switch 40a, two buffer memories 42a and 42b and a switch 40b constitute a double-buffering system input image buffer.

The selector 46 and switches 40a and 40b are controlled by a switch/selector control circuit 32.

The input image is temporarily stored in an image memory 60. An address for writing image data to this image memory 60 and an address for reading image data from the image memory 60 are determined by an address circuit 62.

The operation of the address circuit 62 is controlled by an address control circuit 34. By appropriately controlling read addresses of image data from the memory 60, it is possible to flip images taken by the cameras 8 and 10 horizontally or vertically.

The address control circuit 34 is given an open/close detection signal (signal indicating whether the main unit is folded or not) of a hall element 50 attached to the main unit of the cellular phone terminal.

The destination of the image data output from the memory 60 is controlled by a selector 44. The selector 44 is controlled by the switch/selector control circuit 32.

That is, the image data is sent to the displays 7 and 11 or sent to a coding circuit (image compression circuit) 63.

An input interface 61 includes an image registration key (not shown). When this image registration key is pressed, the switch/selector control circuit 32 controls the selector 44 and sends image data output from the image memory 60 to the coding circuit 63.

The image data coded by the coding circuit 63 is recorded in an image registration memory 21.

This allows an image of a person's face to be registered.

The image registered as shown above is associated with attribute information of the person (e.g., telephone number) and recorded in the image registration memory 21.

That is, the telephone number information of the person to be registered is input from the input interface 61. A registration control circuit 76 associates the address of the image registered in the image registration memory 21 with the telephone number information and records the correlation. Then, the telephone number information is registered in a telephone number memory 22.

Then, a case where a registered image is reproduced will be explained.

A receiver 72 processes a signal received through an antenna 70. The receiver 72 has a function of recognizing a sender's telephone number.

The receiver 72 informs the registration control circuit 76 of the sender's telephone number. The registration control circuit 76 checks whether the informed telephone number is registered in the telephone number memory 22 or not.

If that telephone number is registered, the registration control circuit 76 causes the sender's image to be output from the address corresponding to the telephone number of the image registration memory 21. The output image is decoded by a decoding circuit 66.

Then, the image data is temporarily stored in the memory 60 and the data is read from the memory 60 with the read address being controlled.

Through read address control, it is possible to flip the image vertically or horizontally.

Then, a normal image is displayed on the display 7 or display 11.

In FIG. 5, the switch/selector control circuit 32, address control circuit 34 and registration control circuit 76 constitute a control section 30.

(Embodiment 2)

Figure 6:
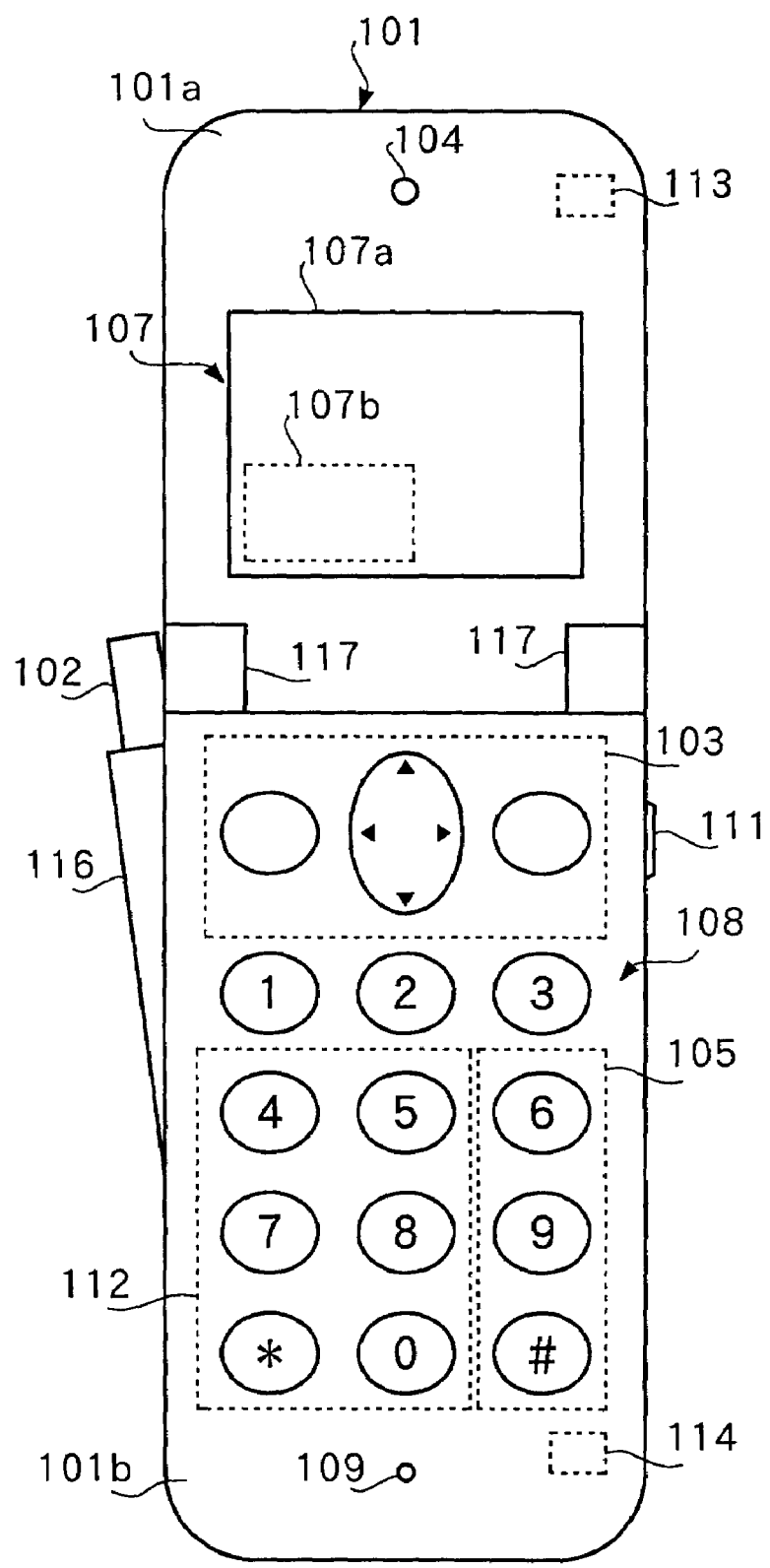
FIG. 6 is a front view showing an example of a folding type portable terminal apparatus (when the housing is not folded) of the present invention.
Figure 7:
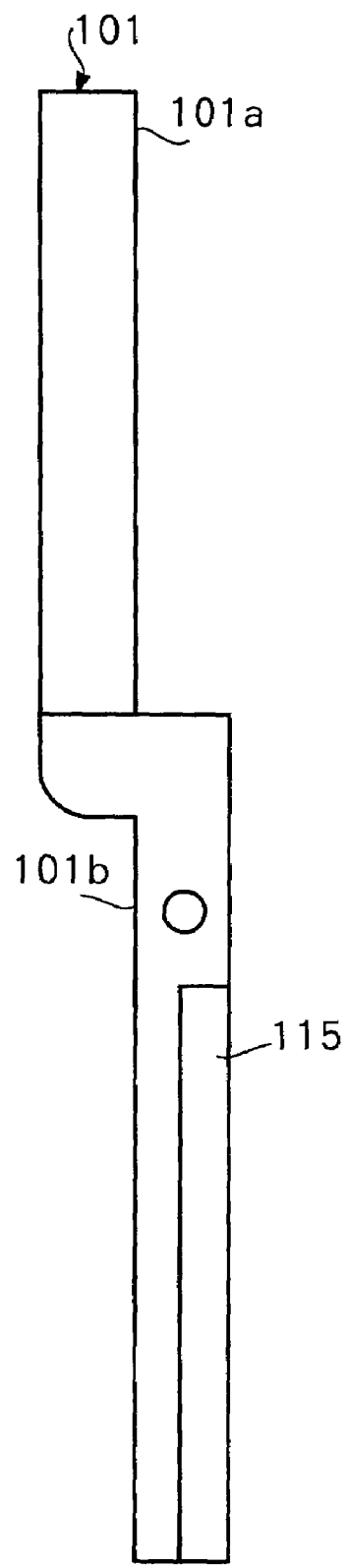
FIG. 7 is a right side view showing an example of the folding type portable terminal apparatus (when the housing is not folded) of the present invention.
Figure 8:
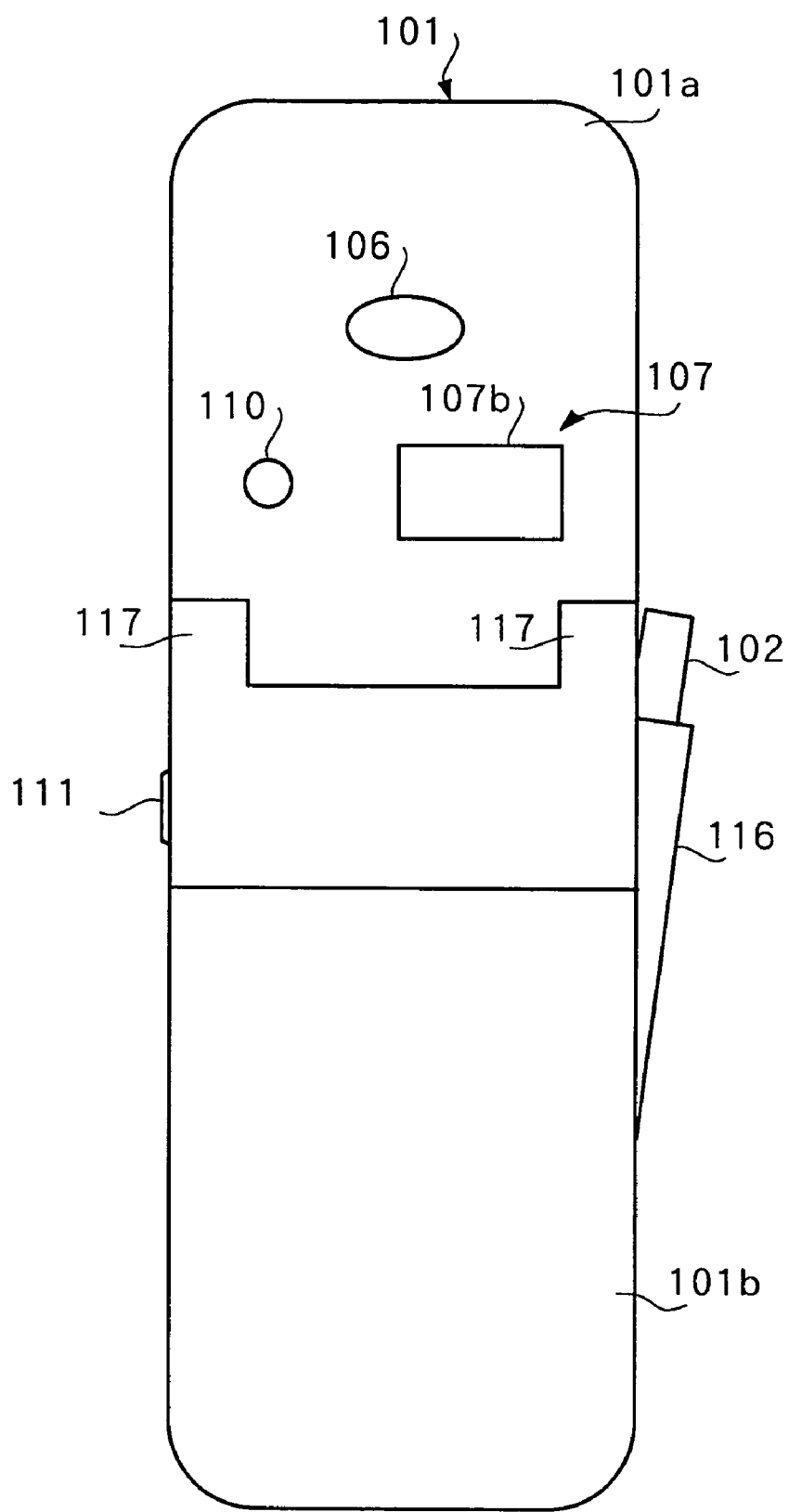
FIG. 8 is a rear view showing an example of the folding type portable terminal apparatus (when the housing is not folded) of the present invention.
Figure 9A:
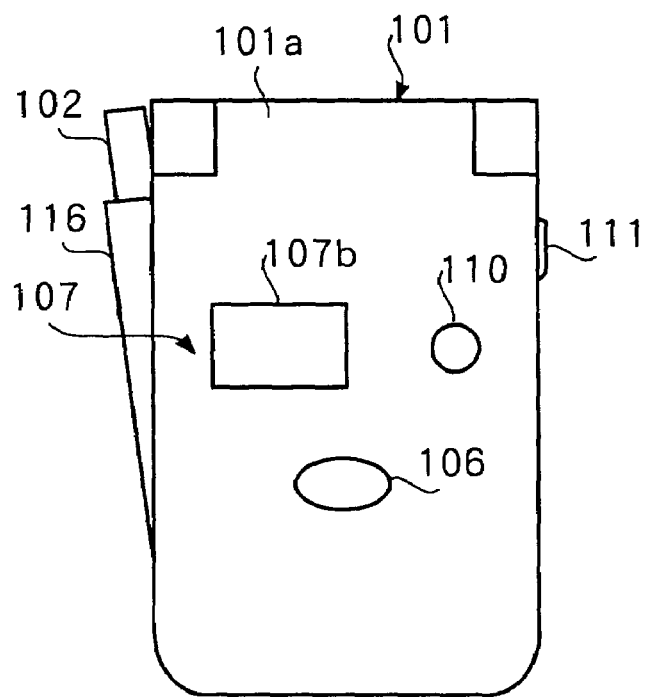
FIG. 9A is a front view showing an example of the folding type portable terminal apparatus (when the housing is folded) of the present invention.
Figure 9B:
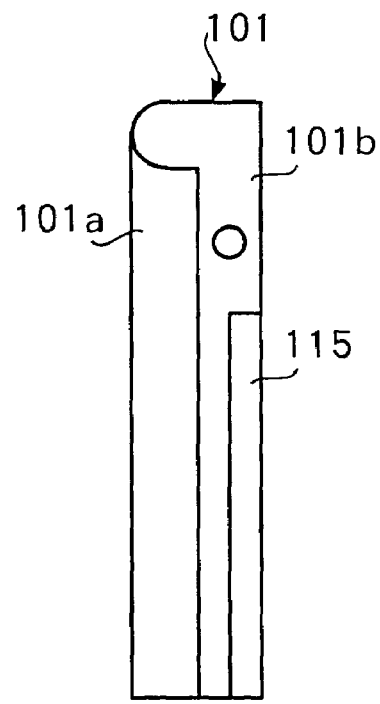
FIG. 9B is a right side view showing an example of the folding type portable terminal apparatus (when the housing is folded) of the present invention.
Figure 10:
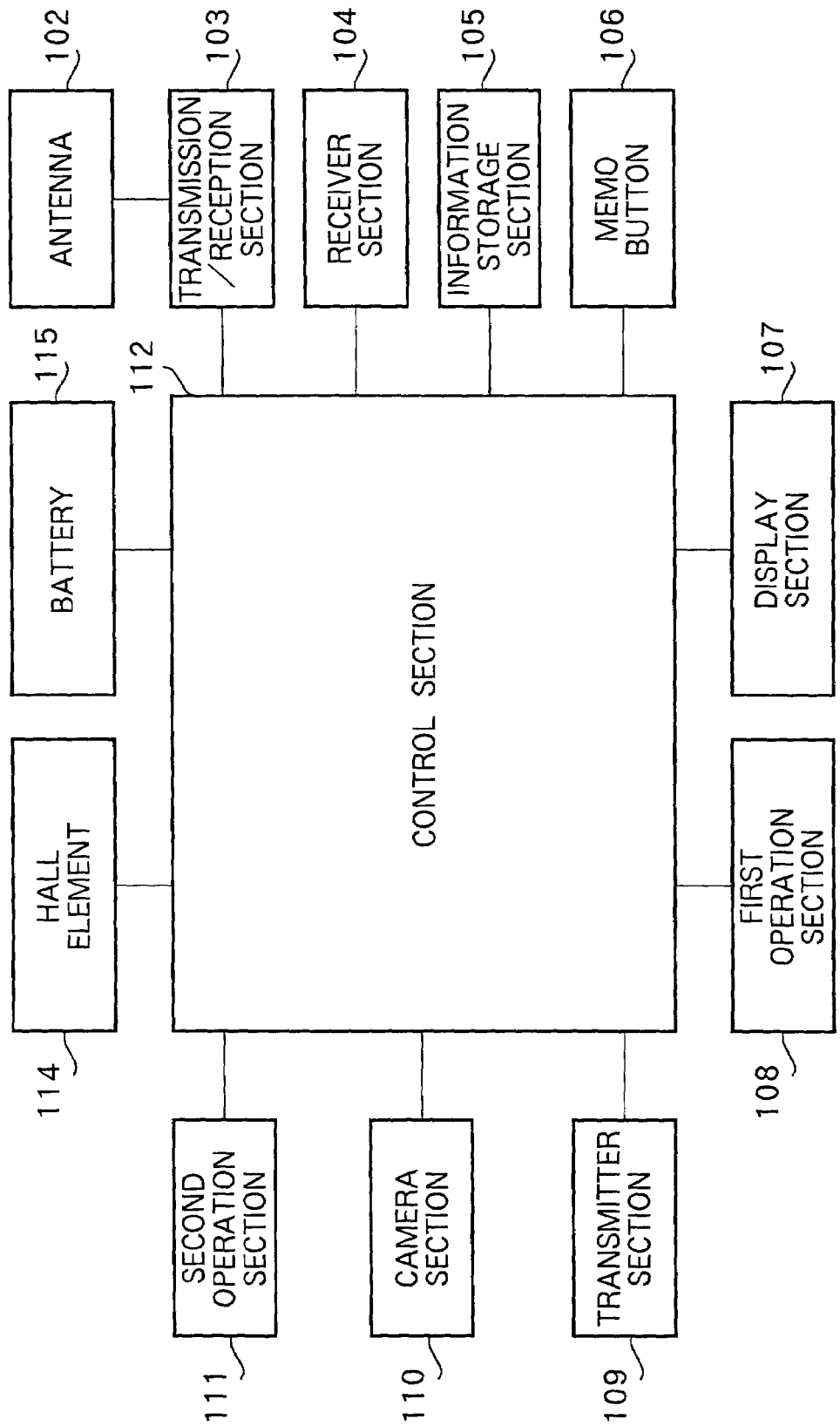
FIG. 10 is a block diagram showing a hardware configuration of an example of the folding type portable terminal apparatus of the present invention.

FIG. 6 is a front view showing an example of a folding type portable terminal of the present invention when it is open. FIG. 7 is a right side view showing the portable terminal apparatus when it is open. FIG. 8 is a rear view showing the portable terminal when it is open. FIG. 9A is a front view showing an example of the portable terminal when it is closed (folded). FIG. 9B is a right side view showing the portable terminal when it is closed. FIG. 10 is a block diagram showing a hardware configuration of the portable terminal.

As shown in FIG. 6 to FIG. 10, the folding type portable terminal according to Embodiment 1 of the present invention is provided with a housing 101, an antenna 102, a transmission/reception section 103, a receiver section 104, an information storage section 105, a memo button 106, a display section 107, a first operation section 108, a transmitter section (microphone) 109, a camera section 110, a second operation section 111 and a control section 112.

The antenna 102, transmission/reception section 103, receiver section 104, information storage section 105, memo button 106, display section 107, first operation section 108, transmission section (microphone) 109, camera section 110, second operation section 111 and control section 112 are provided in the housing 101.

Furthermore, the housing 101 is provided with a permanent magnet 113, a hall element 114 and a battery 115.

As shown in FIG. 10, the transmission/reception section 103 is connected to the antenna 102. The control section 112 is connected to the transmission/reception section 103, receiver section 104, information storage section 105, memo button 106, display section 107, first operation section 108, transmitter section 109, camera section 110, second operation section 111 and hall element 114, and controls these sections. The control section 112 is connected to the battery 115 and supplied with power from this battery 115.

The antenna 102 receives a radio signal and gives the received signal to the transmission/reception section 103. The transmission/reception section 103 processes the signal received from the antenna 102 and gives it to the receiver section 104. The receiver section 104 outputs speech in response to the received signal from the transmission/reception section 103. The transmitter section 109 receives the speech, converts it to a transmission signal and sends it to the transmission/reception section 103. The transmission/reception section 103 processes the transmission signal from the transmitter section 109 and gives it to the antenna 102. The antenna 102 receives the transmission signal from the transmission/reception section 103 and transmits it as a radio signal.

The first operation section 108 is designed to input characters, symbols, numbers and operation signals, etc. The memo button 106 is intended to record a conversation and reproduce the recorded conversation. The second operation section 111 is designed to operate the camera section 110.

As shown in FIG. 6 to FIG. 9A and FIG. 9B, the antenna 102 is provided in a holding section 116 of the housing 101 in an extensible manner.

The housing 101 is constructed of first and second housing members 101a and 101b.

The first and second housing members 101a and 101b are connected via a hinge member 117 in an openable/closable manner.

When the portable terminal apparatus is carried along, it is closed (folded) with the first housing member 101a and the second housing 101b facing each other.

The transmission/reception section 102 is incorporated in the housing 101.

The display section 107 is constructed of first and second display sections 107a and 107b.

The first and second display sections 107a and 107b are constructed of liquid crystal displays and display characters, symbols, numbers and images, etc.

The first display section 107a is provided on the first side of the first housing member 101a which is exposed when the first and second housing members 101a and 101b are opened.

The second display section 107b is provided on the second side opposite the first side of the first housing member 101a.

The camera section 110 is provided on the first side of the first housing member 101a.

The camera section 110 is placed in such a way as to take a picture of an object ahead of the first display section 107a.

The permanent magnet 113 is provided on the first side of the first housing member 101a.

The hall element 114 is provided on the surface of the second housing member 101b that faces the first side of the first housing member 101a when the first housing member 101a and second housing member 101b are closed.

When the first housing member 101a and second housing member 101b are closed, the permanent magnet 113 adjoins the hall element 114, and therefore the hall element 114 detects the permanent magnet 113 and gives a detection signal to the control section 112.

When the first housing member 101a and second housing member 101b are opened, the permanent magnet 113 is separated from the hall element 114, and therefore the hall element 114 cannot detect the permanent magnet 113, and no detection signal is generated.

The control section 112 can recognize the open/closed state of the first housing member 101a and second housing member 101b depending on whether a detection signal is received from the hall element 114 or not.

Next, the operation of the portable terminal according to this embodiment will be explained with reference to FIG. 5 to FIG. 10 and FIG. 11 and FIG. 12.

Figure 11:
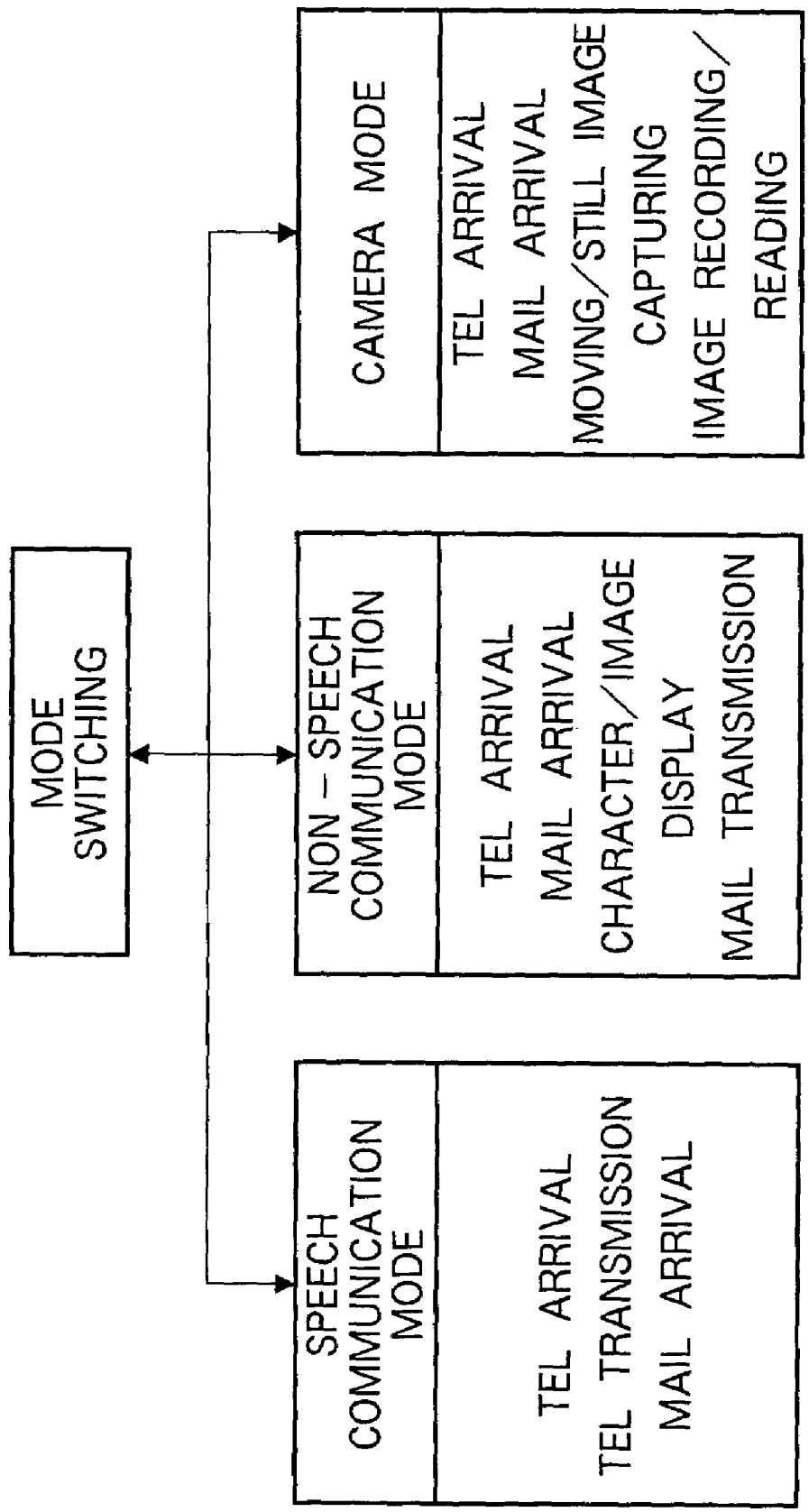
FIG. 11 illustrates operating modes of an example of the folding type portable terminal apparatus of the present invention.
Figure 12:
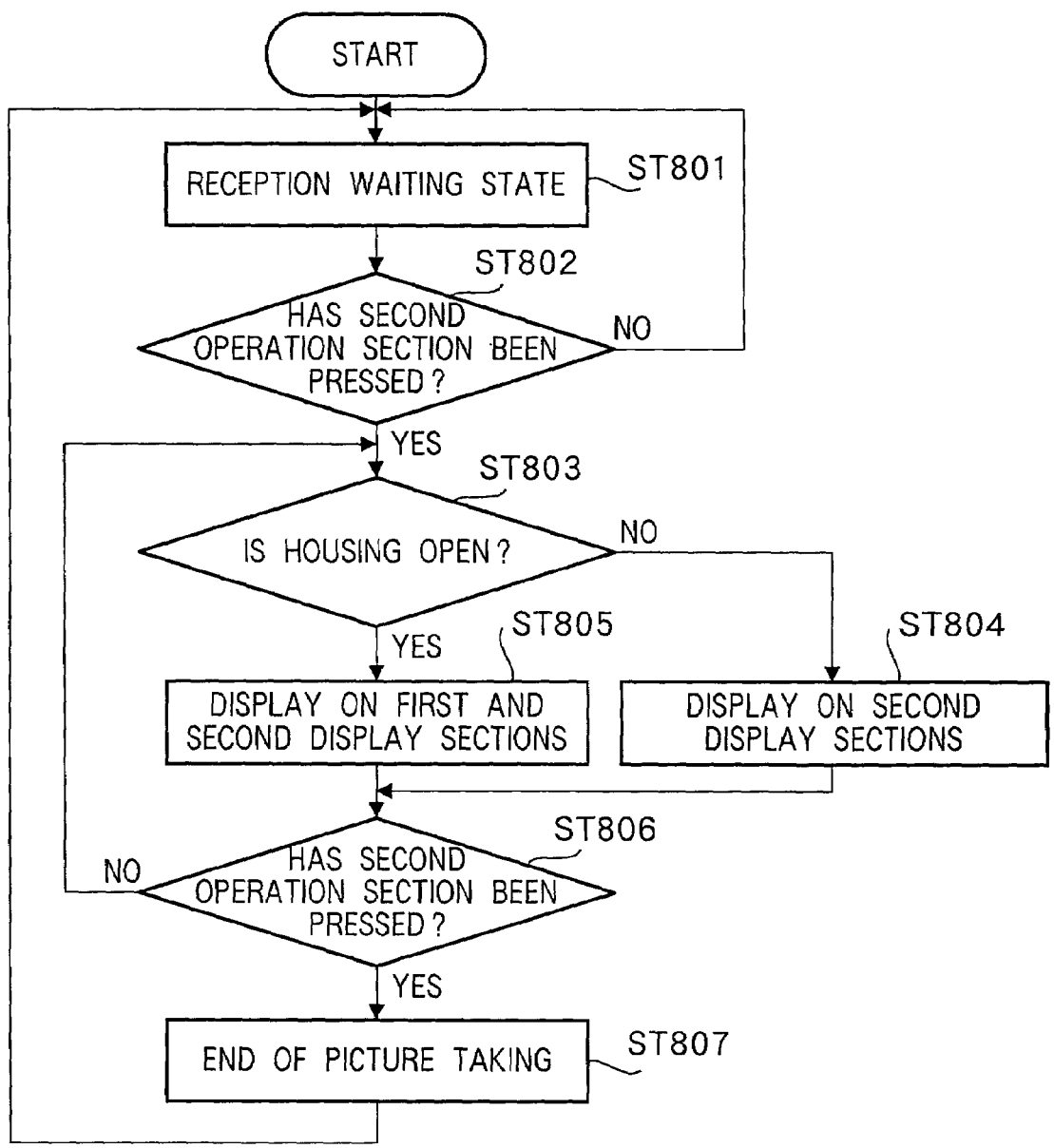
FIG. 12 is a flow chart to illustrate operating modes of an example of the folding type portable terminal apparatus of the present invention.

FIG. 11 illustrates the function of the portable terminal. FIG. 12 is a flow chart to illustrate the operation of the portable terminal.

As shown in FIG. 11, when power is supplied to the portable terminal apparatus, a speech communication mode is started. Mode switching is performed by operating the first or second operation section 108, 111. In a non-speech communication mode or camera mode, various functions can be operated.

In the speech communication mode, a speech or non-speech reception waiting operation starts. Carrying out a speech reception or transmission operation allows the user to enter into conversation with the other party.

In the non-speech communication mode, it is possible to display character information input from the first operation section 108 on the second display section 107b and send it to the other party using the transmission function while maintaining the reception waiting state.

Furthermore, when character information or image information is received, it is possible to display a message that the information has been received on the first display section 107a and second display section 107b and display the character information or image information on the first and second display sections 107a and 107b through a predetermined operation.

To confirm the party on the other end before entering into a speech or non-speech communication, it is possible to select and confirm the party on the other end using a telephone directory function.

In the camera mode, it is possible to display image information projected on the optical/electrical conversion element through the lens of the camera section 110 on the first display section 107a or second display section 107b and store image information in the information storage section 105.

The operation of the portable terminal will be explained with reference to FIG. 12.

As shown in FIG. 12, when power is turned on, the system is set in a reception waiting state (step ST801).

Then, in order for the camera section 110 to start picture taking, the control section 112 decides whether the second operation section 111 has been pressed once or not (step ST802).

When the second operation section 111 has been pressed once in step ST802, the control section 112 decides whether the housing 101 is open or not based on the presence/absence of a detection signal from the hall element 114 (step ST803).

When the housing 101 is closed in step ST803, the image information created by the camera section 110 is displayed on the second display section 107b (step ST804).

When the housing 101 is open in step ST803, the image information created by the camera section 110 is displayed on the first and second display sections 107a and 107b (step ST805).

After steps ST804 and 805, to finish picture taking, the control section 112 decides whether the second operation section 111 has been pressed once or not (step ST806).

In step ST806, if the second operation section 111 has not been pressed once, the process moves back to ST803.

In step ST806, when the second operation section 111 has been pressed once, the picture taking is finished (step ST807) and the process moves back to step ST801.

When pressed in a reception waiting state, the second operation section 111 causes the camera section 110 to start picture taking, but when pressed when the camera section 110 is in operation, the second operation section 111 finishes the operation of the camera section 110.

Then, an example of use of this folding type portable terminal apparatus according to Embodiment 1 of the present invention will be explained.

When the portable terminal apparatus is used with the housing 101 closed, the user holds the camera section 110 and directs it toward a desired direction and can thereby take a picture of an object.

Furthermore, when the user takes a picture of himself/herself using the portable terminal apparatus, the user directs the camera section 110 toward himself/herself if the housing 101 is closed and starts to take a picture.

Then, the user can check the second display section 107b to know how the image of the user himself/herself appears.

Furthermore, the user can also check how the image of the user himself/herself appears or what extent of the surrounding area is included in the image taken by opening the housing 101 and checking with the first display section 107a.

Furthermore, when the user takes a picture of scenery or people ahead of the user himself/herself using the portable terminal apparatus, the user opens the housing 101, directs the camera section 110 forward, and can thereby take a picture and further check image information by viewing the first display section 107a facing the user himself/herself.

Therefore, it is possible to check whether the center of the object and magnification are different from those desired by the user himself/herself or not, and therefore the user can check how the picture appears during picture taking.

Furthermore, when the housing 101 is opened and the picture taken is displayed on both or either one of the first and second display sections 107a and 107b, if the object is a person, the person himself/herself can check the image information displayed on the second display section 107b. Furthermore, the person who has taken the picture (the user himself/herself) can also check the image information displayed on the first display section 107a.

Then, the image information displayed on the display section of the portable terminal according to this embodiment will be explained with reference to FIG. 13A and FIG. 13B.

Figure 13A:
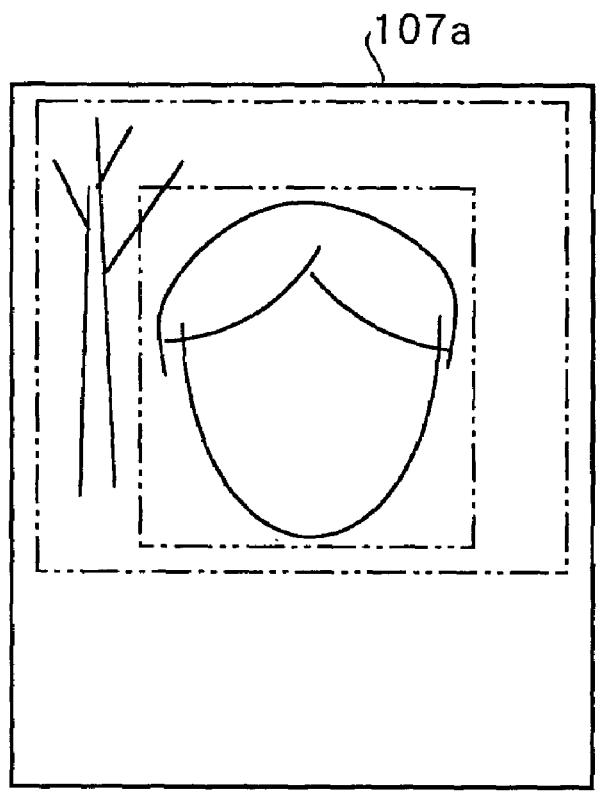
FIG. 13A illustrates an image shown on a first display of an example of the folding type portable terminal apparatus of the present invention.
Figure 13B:
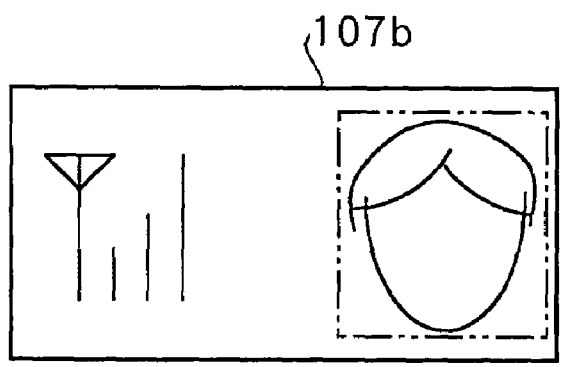
FIG. 13B illustrates an image shown on a second display of an example of the folding type portable terminal apparatus of the present invention.

FIG. 13A and FIG. 13B illustrate image information displayed on the first and second display sections 107a and 107b (FIG. 6) of the portable terminal.

As shown in FIG. 13A, when a picture of a person ahead is taken with the housing 101 left open, for example, a person and background are displayed on the first display section 107a. FIG. 13A shows the face of the person and trees in a background.

As shown in FIG. 13B, when the image is not displayed on the first display section 107a, a mark indicating field intensity and time (not shown) are shown.

When the image is displayed on the second display section 107b, only the partial area around the center of the image shown on the first display section 107a is displayed together with the mark indicating field intensity (FIG. 13B).

As described above, when the object is a person, what the person wants to check is the own countenance and whether the neck is inclined or not, etc., that is, the appearance of the person.

Furthermore, when the second display section 107b is too large, it is not possible to reduce the size and weight of the apparatus to improve the portability of the portable terminal.

Thus, the size of the first display section 107a is kept constant and the second display section 107b is made smaller than the first display section 107a.

Furthermore, the second display section 107b shows an enlarged view of part of the image information on the first display section 107a.

This makes it easier for the person who gets his/her picture taken to see and check the image information on the second display section 107b and can also reduce the size of the apparatus.

While the housing 101 is open or housing 101 is closed, the magnification of the image information displayed on the second display section 107b may be the same or may be different.

Moreover, the image displayed on the second display section 107b may also be used as a mirrored image for the person who wants to use it as a mirror.

Embodiment 1 of the present invention is also applicable to any portable terminal other than a folding type portable terminal. In this case, the display section 107 is constructed of a first display section 107a provided on the first side of the housing 101 and the second display section 107b provided on the second side provided opposite the first side of the housing 101.

When a picture of a person is taken, Embodiment 1 of the present invention allows both the user and the person who gets his/her picture taken to see the image taken and created by the camera section 110. Thus, both the user and the person who gets his/her picture taken can check the captured image.

(Embodiment 3)

Then, Embodiment 3 of the present invention will be explained with reference to FIG. 14 to FIG. 18A and FIG. 18B.

In FIG. 14 to FIG. 18A and FIG. 18B, the same components as those in the foregoing figures are assigned the same reference numerals.

Figure 14:
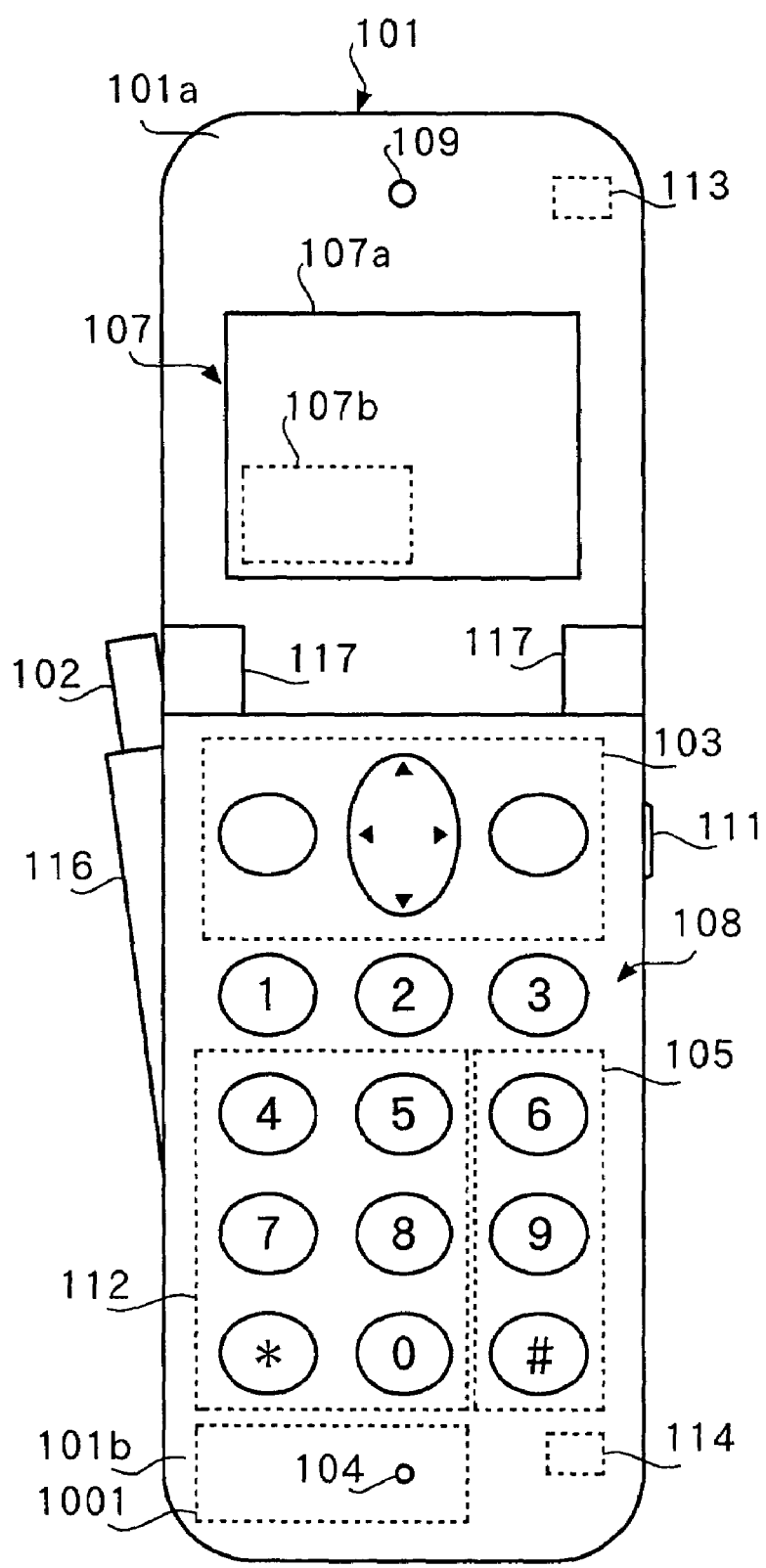
FIG. 14 is a front view of another example of the portable terminal apparatus of the present invention.
Figure 15:
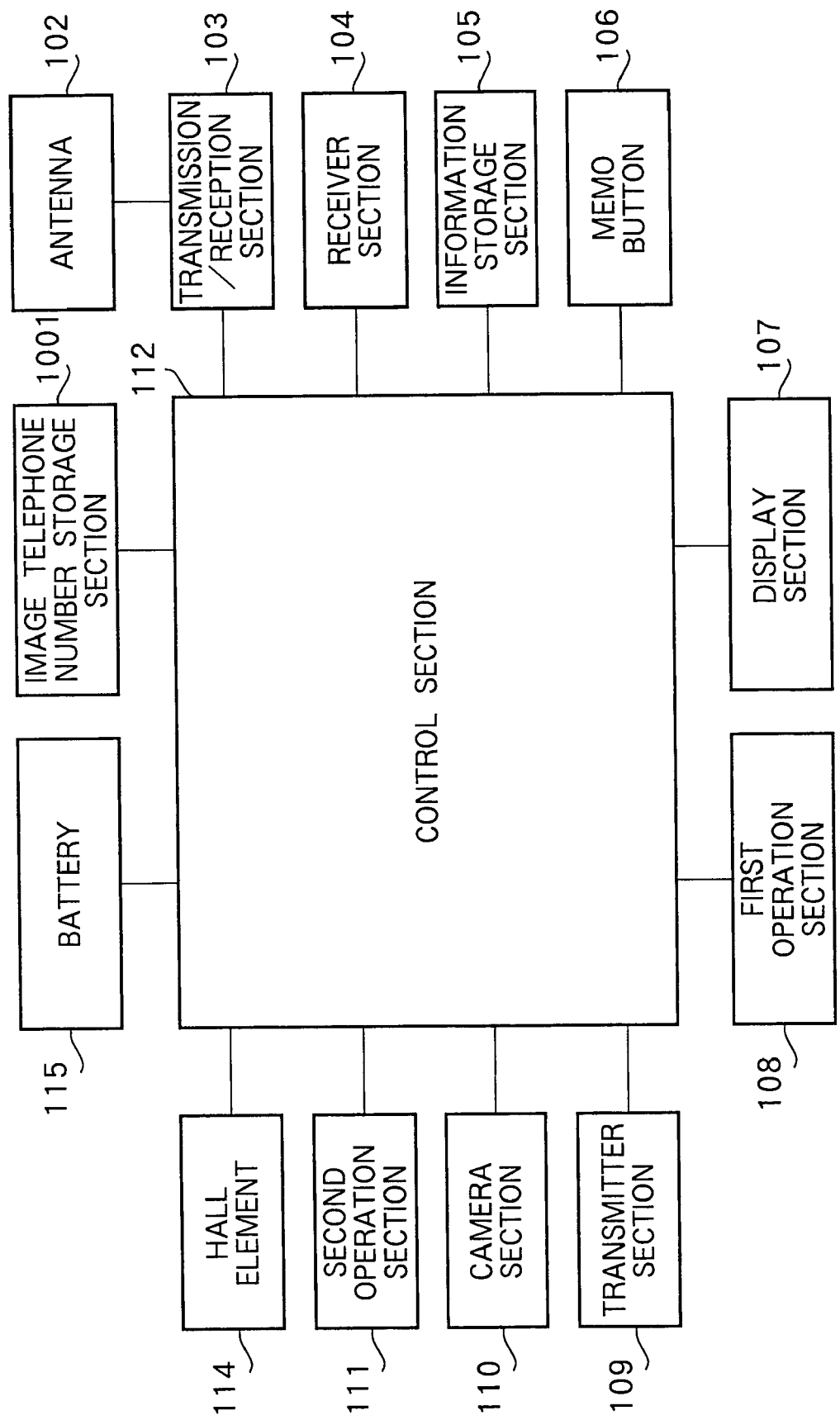
FIG. 15 is a block diagram showing a hardware configuration of the other example of the portable terminal apparatus of the present invention.

A feature of the cellular phone terminal shown in FIG. 14 and FIG. 15 is that an image telephone number storage section 1001 is added to the portable terminal shown in FIG. 6 and FIG. 10.

The image telephone number storage section 1001 is provided on the housing 101.

The image telephone number storage section 1001 stores image telephone number information which associates image information created by the camera section 110 with the telephone number of the person photographed (the person who becomes the sender) related to this image information.

More specifically, the image telephone number storage section 1001 stores the image information from the camera section 110, the telephone number and name of the person photographed with a search number assigned. It also stores such information by group of persons photographed.

These groups can be set arbitrarily by the user and, for example, people are grouped into the user's friends, job-related people and family members and so on.

Figure 16:
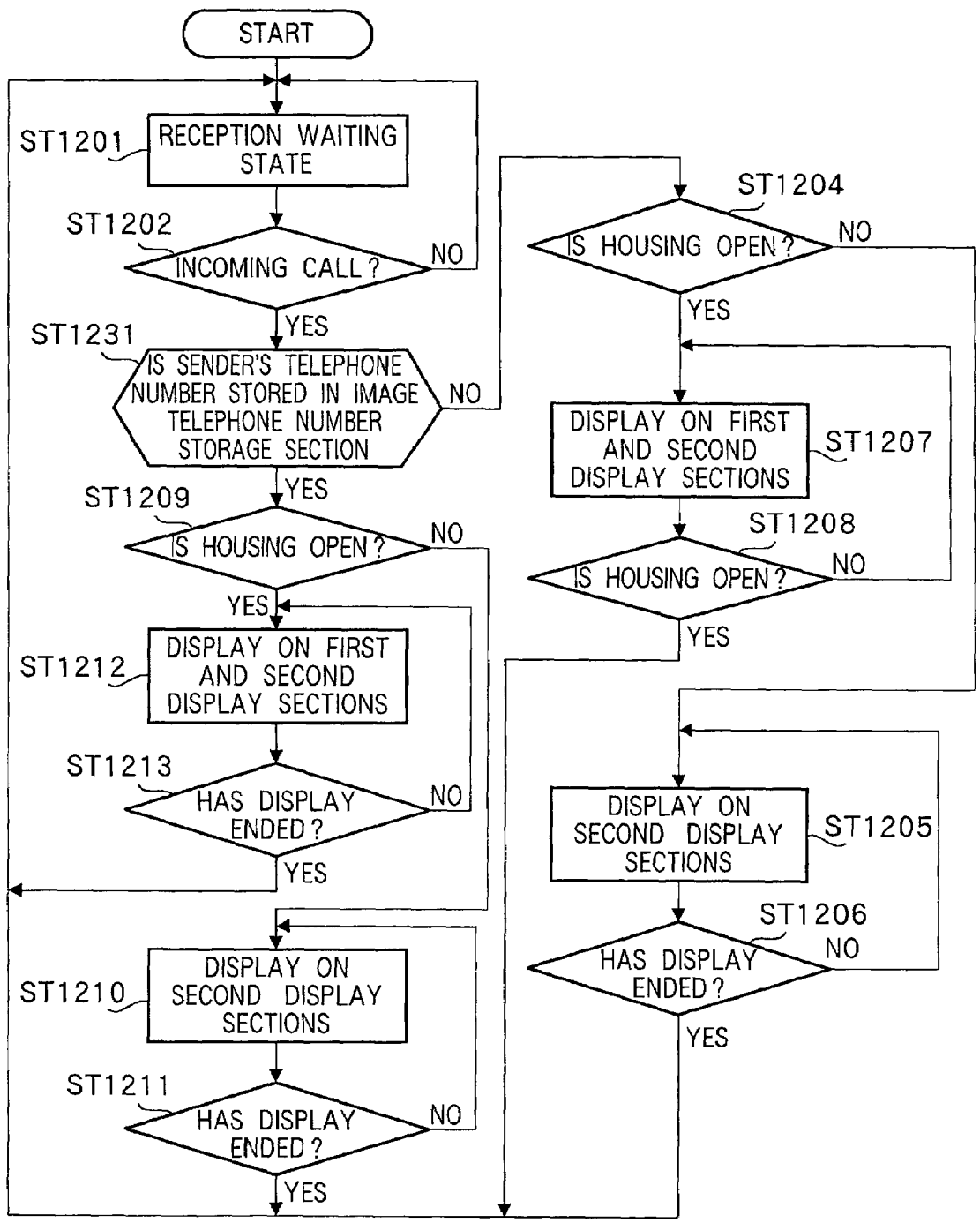
FIG. 16 is a flow chart to illustrate an operation of the other example of the portable terminal apparatus of the present invention.

FIG. 16 is a flow chart to illustrate the operation of the portable terminal according to this embodiment.

As shown in FIG. 16, the control section 112 decides whether power is turned on and the system is in a reception waiting state or not (step ST1201).

When the system is in a reception waiting state, as shown in FIG. 17A, when the housing 101 is closed, nothing is displayed on the first display section 107a or a mark indicating field intensity and time are shown on the second display section 107b as shown in FIG. 17B.

When the housing 101 is opened, the image information displayed on the second display section 107b may also be displayed on the first display section 107a, but the illustration thereof will be omitted here.

Then, the control section 112 decides whether there is any incoming call in step ST1202. If there is some incoming call, the control section 112 decides whether the sender's telephone number is found among telephone numbers stored in the image telephone number storage section 1001 or not (step ST1203).

In step ST1203, if the sender's telephone number is not found among the telephone numbers stored in the image telephone number storage section 1001, the control section 112 decides in step ST1204 whether the housing 101 is open or not based on the presence/absence of a detection signal from the hall element 114.

In step ST1204, if the housing 101 is not open, the control section 112 displays a message "Arrival of call" on the second display section 107b in step ST1205 as shown in FIG. 17C.

Then, in step ST1206, the control section 112 decides whether the display is finished or not and if the display is finished, the control section 112 returns to step ST1201.

In step ST1204, if the housing 101 is open, the control section 112 displays a message "Arrival of call" on the first and second display sections 107a and 107b in step ST1207 as shown in FIG. 17C and FIG. 17D.

Then, in step ST1208, the control section 112 decides whether the display is finished or not, and if the display is finished, the control section 112 returns to step ST1201.

In step ST1203, if the sender's telephone number is found among the telephone numbers stored in the image telephone number storage section 1001, the control section 112 decides whether the housing 101 is open or not in step ST1209.

Figure 18A:
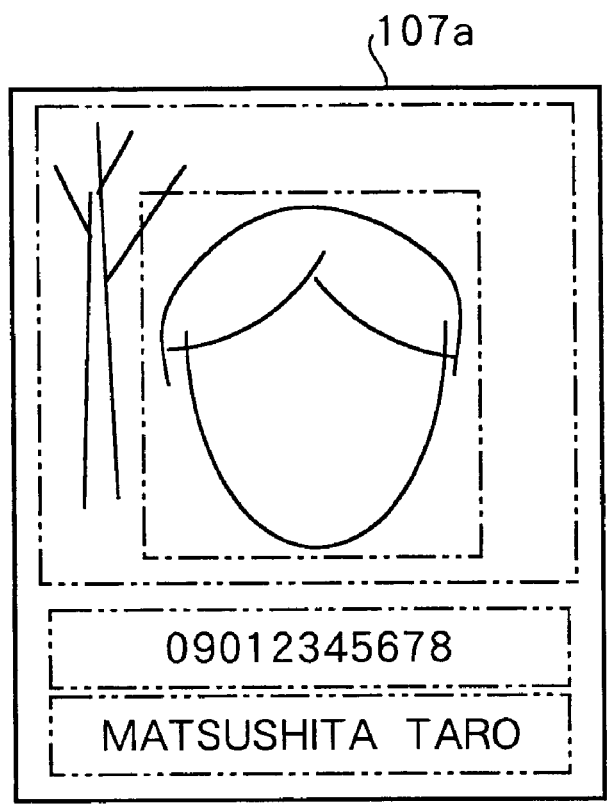
FIG. 18A illustrates a further example of the first display in the other example of the portable terminal apparatus of the present invention.
Figure 18B:
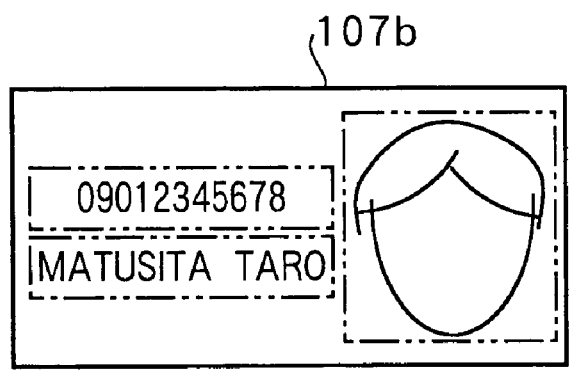
FIG. 18B illustrates a further example of the second display in the other example of the portable terminal apparatus of the present invention.

In step ST1209, if the housing 101 is not open, the control section 112 displays the image information, the sender's telephone number and name on the second display section 107b in step ST1210 as shown in FIG. 18B.

Then, in step ST1211, the control section 112 decides whether the display is finished or not and if the display is finished, it returns to step ST1201.

In step ST1209, if the housing 101 is open, the control section 112 displays the image information, the sender's telephone number and name on the first and second display sections 107a and 107b in step ST1212 as shown in FIG. 18A and FIG. 18B.

Then, instep ST1213, the control section 112 decides whether the display is finished or not and if the display is finished, it returns to step ST1201.

Generally, the user identifies the sender by looking at the sender's telephone number and name, but the user may forget it.

At this time, the user may remember them by looking at the image information (face).

Thus, upon arrival of a call, if the same telephone number as that of the sender is stored in the image telephone number storage section 1001, the image information associated with the telephone number is displayed. This allows the sender to be identified easily.

This embodiment displays the image information, telephone number and name on the first and second display sections 107a and 107b, but it is also possible to display image information together with any one of the telephone number or name.

Furthermore, it is also possible to show only image information.

Furthermore, there may be people who do not want images of their own faces to be used for the purpose of identification. In such a case, only attribute information such as the sender's telephone number and name is displayed upon arrival of a call.

It would be convenient if it is possible to select whether to display an image or both an image and attribute information or only attribute information Furthermore, if Embodiment 2 of the present invention is adapted to add the date and time of recording to image information stored in the image telephone number storage section 1001, the user can identify the sender more easily.

Furthermore, image information taken by the camera section 110 is used here, but image information taken by another image pickup device or digital camera, etc., can also be used. Or image information input from a personal computer can be used.

Furthermore, it is also possible to use image information created with edited information using software for creating dummy photo or portrait based on image information taken by an image pickup device or digital camera, etc.

That is, the present invention is also applicable to a case where an externally input image is displayed on the display of the portable terminal.

Furthermore, the display section 107 may also be constructed of one display section.

Furthermore, the present invention is also applicable to a portable terminal apparatus other than a folding type portable terminal apparatus. In this case, the display section 107 is constructed of the first display section 107a provided on the first side of the housing 101 and the second display section 107b provided on the second side opposite the first side of the housing 101.

As described above, this embodiment can easily identify a sender by displaying an image of the sender's face together with the sender's telephone number on the first display section 107a or second display section 107b.

(Embodiment 4)

Embodiment 4 of the present invention will be explained using FIG. 19A, FIG. 19B, FIG. 19C and FIG. 20 below.

When the user of a portable terminal with a camera takes a picture of an object (person), this embodiment allows both the user and the object to see the picture taken which is visually adequate.

Furthermore, when an image recorded while the housing is either open or closed is reproduced and presented on a display, this embodiment presents an image visually adequate to the user or object on the display.

Furthermore, this embodiment will also describe a more specific mode when the display section is used as a substitute for a mirror (to take a picture of one's own face by oneself).

The basic contents of this embodiment are included in the foregoing embodiments.

That is, the aforementioned control section 112 in FIG. 10 changes the vertical and horizontal position of the image displayed according to the situation so that the image is displayed correctly.

In this case, the control section 112 decides which display section displays the image, whether the side on which the camera is mounted is the same as the side on which the display section is mounted or whether the housing is folded differently when the image is taken and when the image is displayed, etc., in real time based on the information given from various sections in FIG. 10.

Then, based on the decision result, the control section 112 reverses the image horizontally or vertically as appropriate to always display an image visually adequate to the viewer on the display.

Furthermore, as in the case of the foregoing embodiments, this embodiment displays an image taken in association with a telephone number as appropriate.

That is, this embodiment stores images in association with their respective telephone numbers in a telephone directory function and when a call arrives from a party on the other end whose telephone number matches a telephone number stored, this embodiment displays the image associated with the sender's telephone number on the display section. This allows the user to identify the sender easily.

This embodiment will be explained more specifically with reference to drawings below.

Figure 19A:
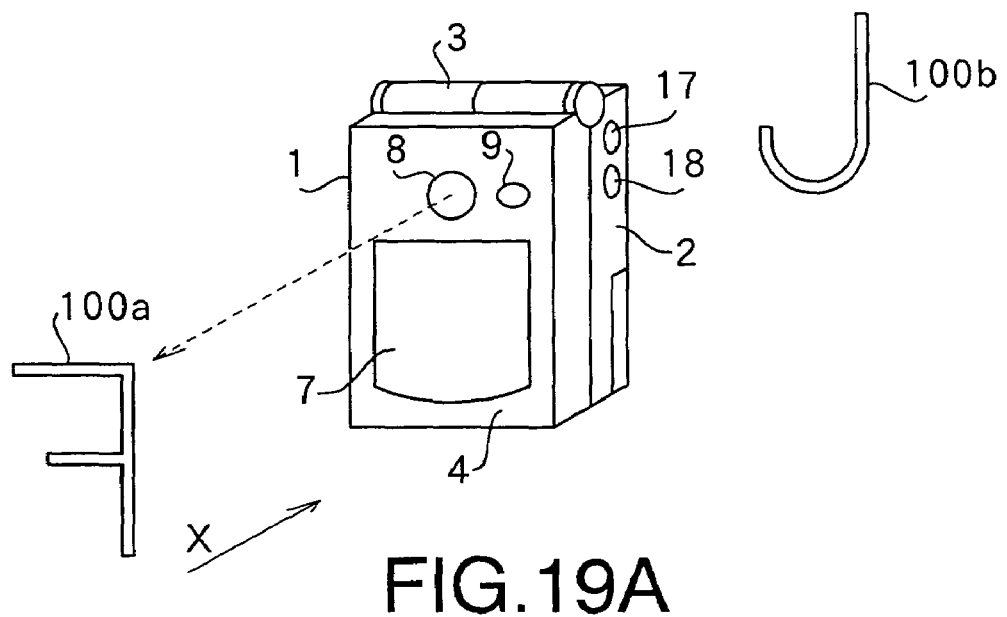
FIG. 19A is a perspective view showing an appearance of the housing when it is folded in a further example of the folding type portable terminal apparatus of the present invention.
Figures 19B, 19C:
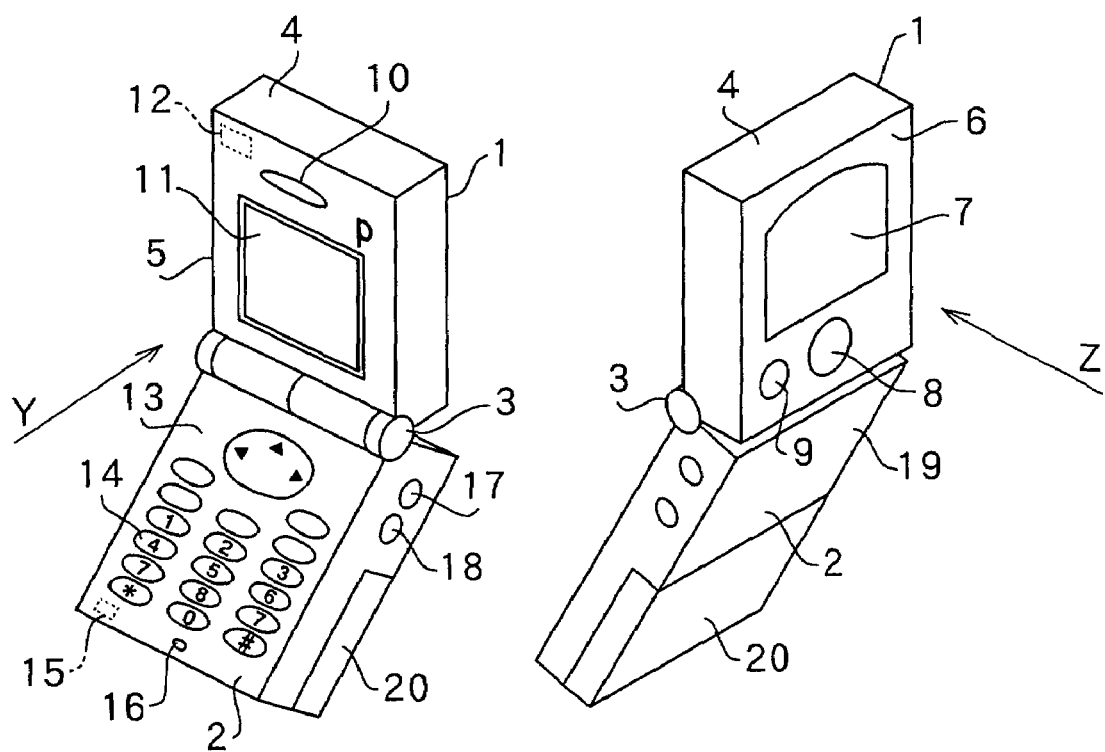
FIG. 19B is a perspective view seen from one direction of the housing when it is not folded in the further example of the folding type portable terminal apparatus of the present invention.
FIG. 19C is a perspective view seen from another direction of the housing when it is not folded in the further example of the folding type portable terminal apparatus of the present invention.

FIG. 19A, FIG. 19B and FIG. 19C illustrate an appearance of a folding type cellular phone set according to this embodiment.

FIG. 19A is a perspective view when the cellular phone set is closed, FIG. 19B is a front perspective view when the cellular phone set is open and FIG. 19C is a rear perspective view.

In FIG. 19A and FIG. 19B, an upper housing 1 and lower housing 2 are coupled in a mutually foldable (openable/closable) manner via a hinge section 3 provided on the housings 1 and 2, thus forming a housing 4.

When the housing is carried along by the user, the upper housing 1 and lower housing 2 are closed (folded) facing each other and opened during a conversation.

The upper housing 1 has a side 6 opposite a side 5 facing the lower housing 2 when folded, which is provided with a quasi-flat first display section 7 that displays characters, symbols, numbers and images, etc., a camera section 8 made up of a lens, optical/electrical conversion element and image processing section, a first operation section (camera button) 9 that selects a camera mode to start picture taking using the camera section 8. The opposite side 5 accommodates a receiver section 10 that outputs speech, a second display section 11 which displays characters, symbols, numbers and images, etc., and is larger than the first display section 7 both vertically and horizontally and a permanent magnet 12, etc.

The lower housing 2 has a side 13 facing the upper housing 1 when folded, which accommodates a second operation section 14 having a function of inputting characters, symbols and numbers, etc., with characters, symbols and numbers, etc., printed thereon, a hall element 15 provided at a position that it overlaps with the permanent magnet 12 when the upper housing 1 and lower housing 2 are folded and a transmitter section (microphone) 16, etc.

On the right side are a third operation section (recording button) 17 that starts or stops recording of an image taken by the camera section 8 and a fourth operation section 18 having a selection function for selecting whether an image taken is recorded as a still image or moving image and a switching function for, when a name (image name) is assigned to the recorded image, switching and displaying image names sequentially.

On a side 19 opposite the side 13 of the lower housing 2, a battery 20 that supplies power to the housing 4 is provided in a detachable manner.

Furthermore, the upper housing 1 and lower housing 2 accommodate printed wiring boards (not shown) provided with a radio circuit section made up of a transmission section and reception section and a control circuit section made up of a recording section and IC, etc., and both housings are electrically connected via a flexible printed wiring board (not shown) wound in a hinge section 3.

A hall element detects whether the housing 4 is folded or not. When the housing is folded (closed), the permanent magnet 12 overlaps with the hall element 15. This overlapping is detected by the hall element 15 and a detection signal is sent to the control section 112. This allows the control section 112 to recognize that the housing is closed.

While the housing is open, the permanent magnet 12 separates from the hall element 15. Therefore, sending of a detection signal from the hall element 15 to the control section 112 is stopped. Thus, the control section 112 can recognize that the housing 4 is open. In this way, the open/closed state of the housing 4 can be detected using the permanent magnet 12 and hall element 15.

Figure 20:
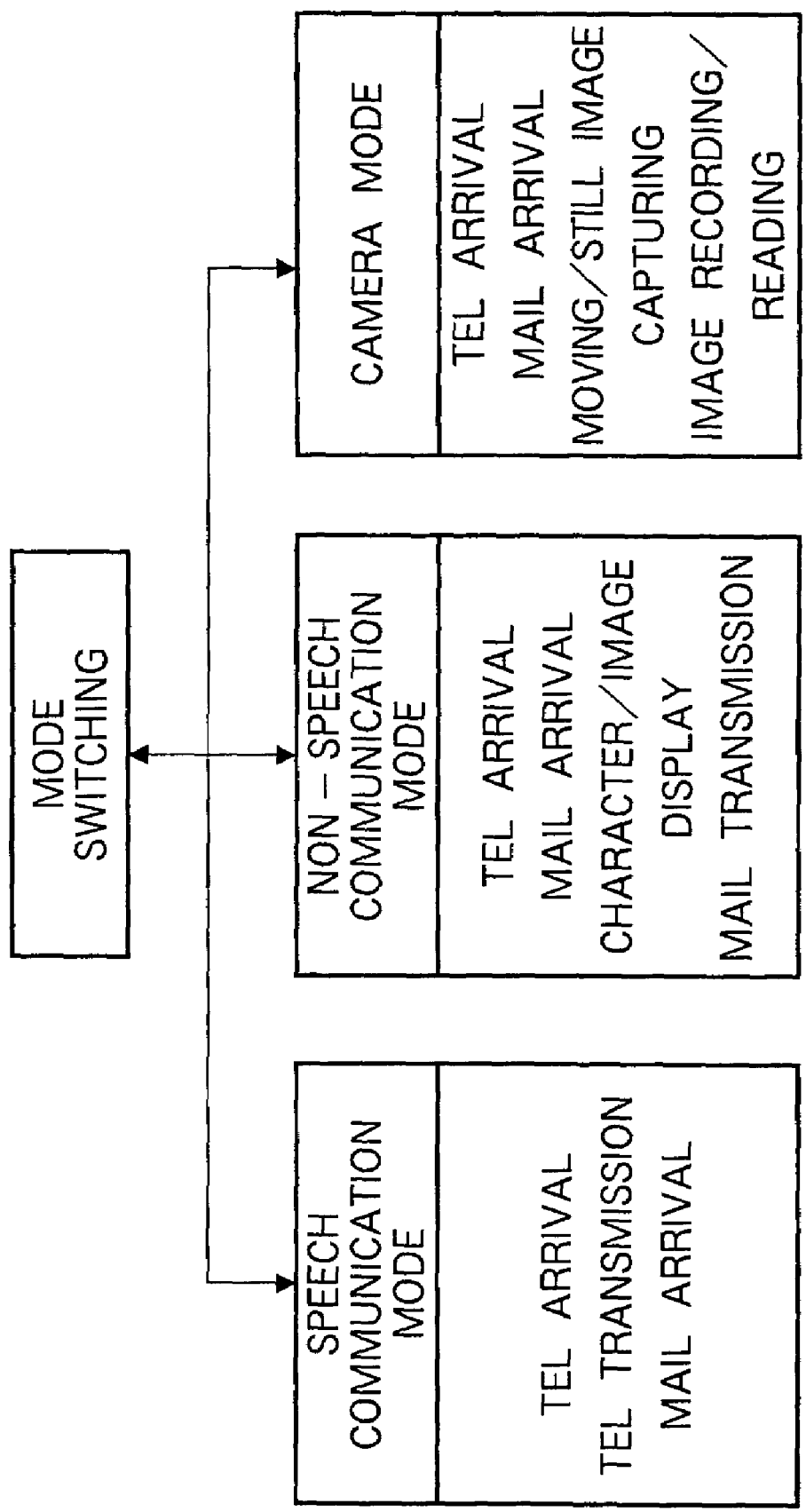
FIG. 20 illustrates operating modes in the further example of the folding type portable terminal apparatus of the present invention.

FIG. 20 illustrates the functions of the cellular phone terminal.

When power is supplied to the housing, a speech communication mode is started. Operating the first or second operation section 9 or 14 can switch between the modes.

In the speech communication mode, a speech/non-speech reception waiting operation, speech receiving operation or transmitting operation is executed.

In the non-speech communication mode, it is possible to display the character information input from the second operation section 14 on the second display section 11 while keeping the reception waiting state and further send data to the party on the other end using the transmission function.

Furthermore, when character information or image information is received, a message indicating the reception is displayed on the first or second display section 7 or 11.

Furthermore, it is also possible to display character information or image information on the first and second display section 7 or 11 through a predetermined operation.

To confirm the party on the other end of transmission when a speech or non-speech communication is carried out, it is possible to select and confirm the party on the other end of transmission using the telephone directory function.

In a camera mode, it is possible to display an image projected onto the optical/electrical conversion element through the lens in the camera section 8 on the first and/or second display section 7 and/or 11 or record (store) the image in the recording section of the control section.

Furthermore, it is possible to read the recorded image stored in the recording section and reproduce/display the image on the first or second display section 7 or 11.

Then, the operation will be explained.

Figure 21:
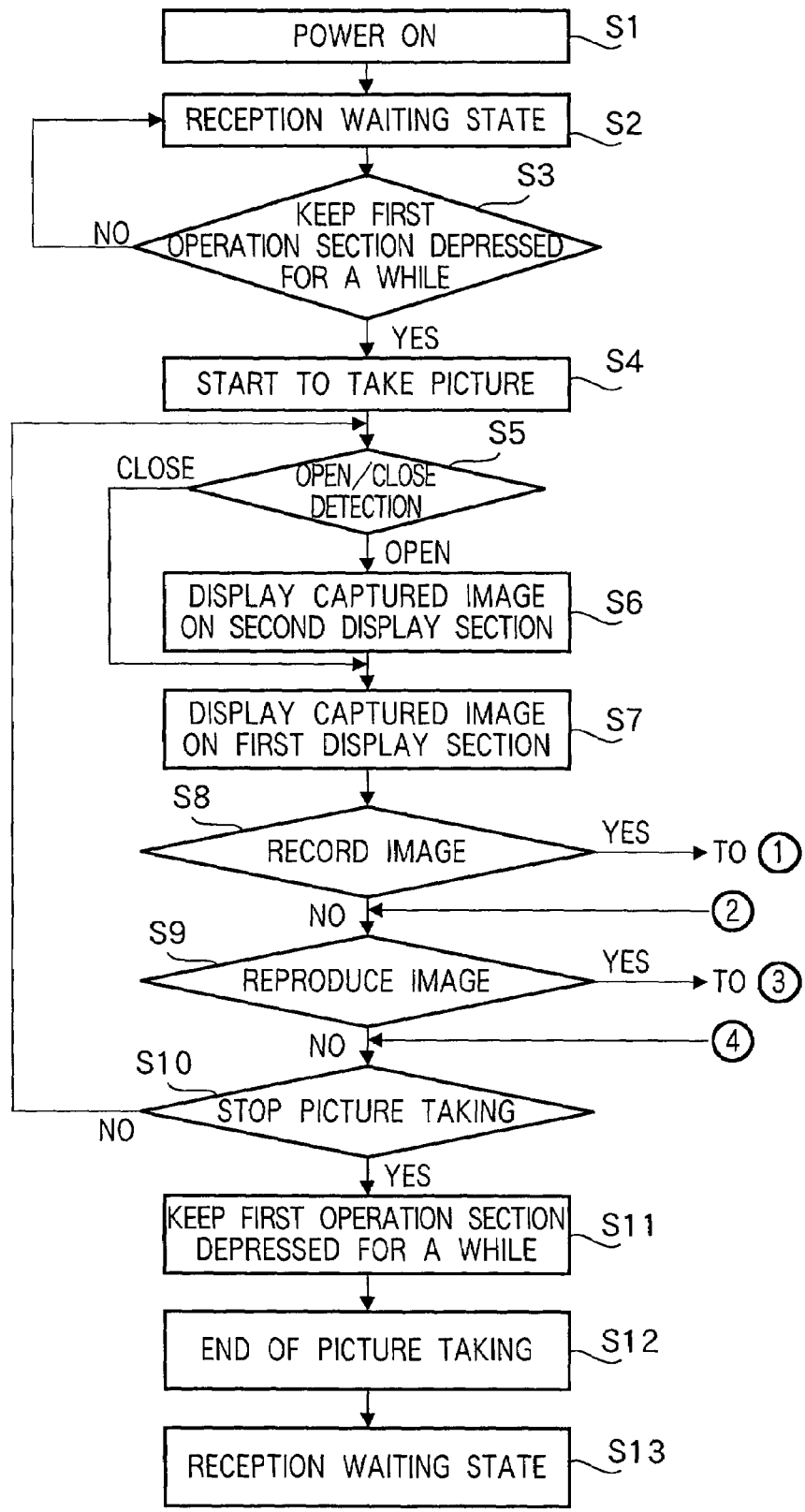
FIG. 21 is a flow chart to illustrate a basic procedure from the start to the end of picture taking.
Figure 22:
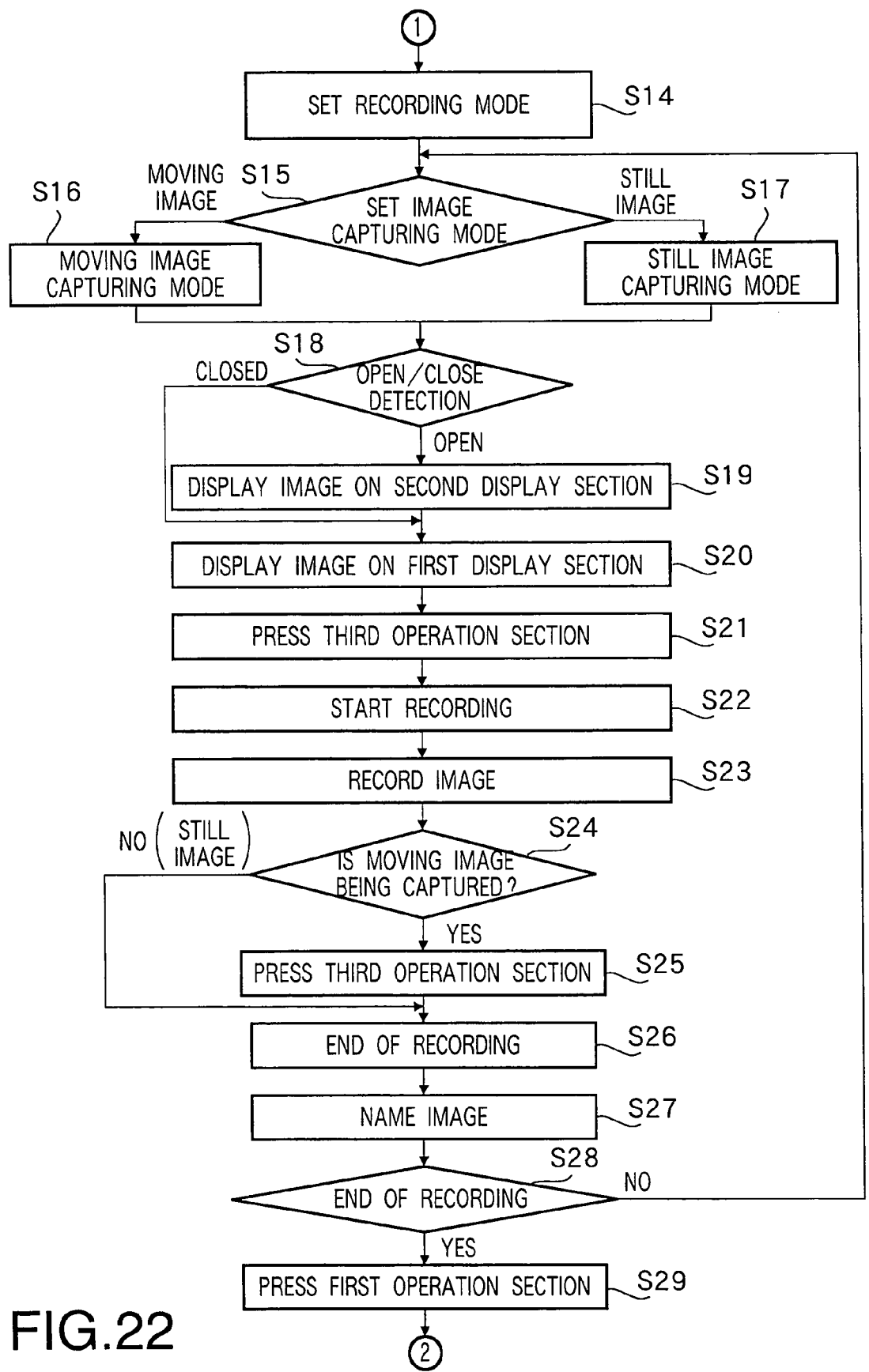
FIG. 22 is a flow chart to illustrate a procedure when a captured image is recorded.
Figure 23:
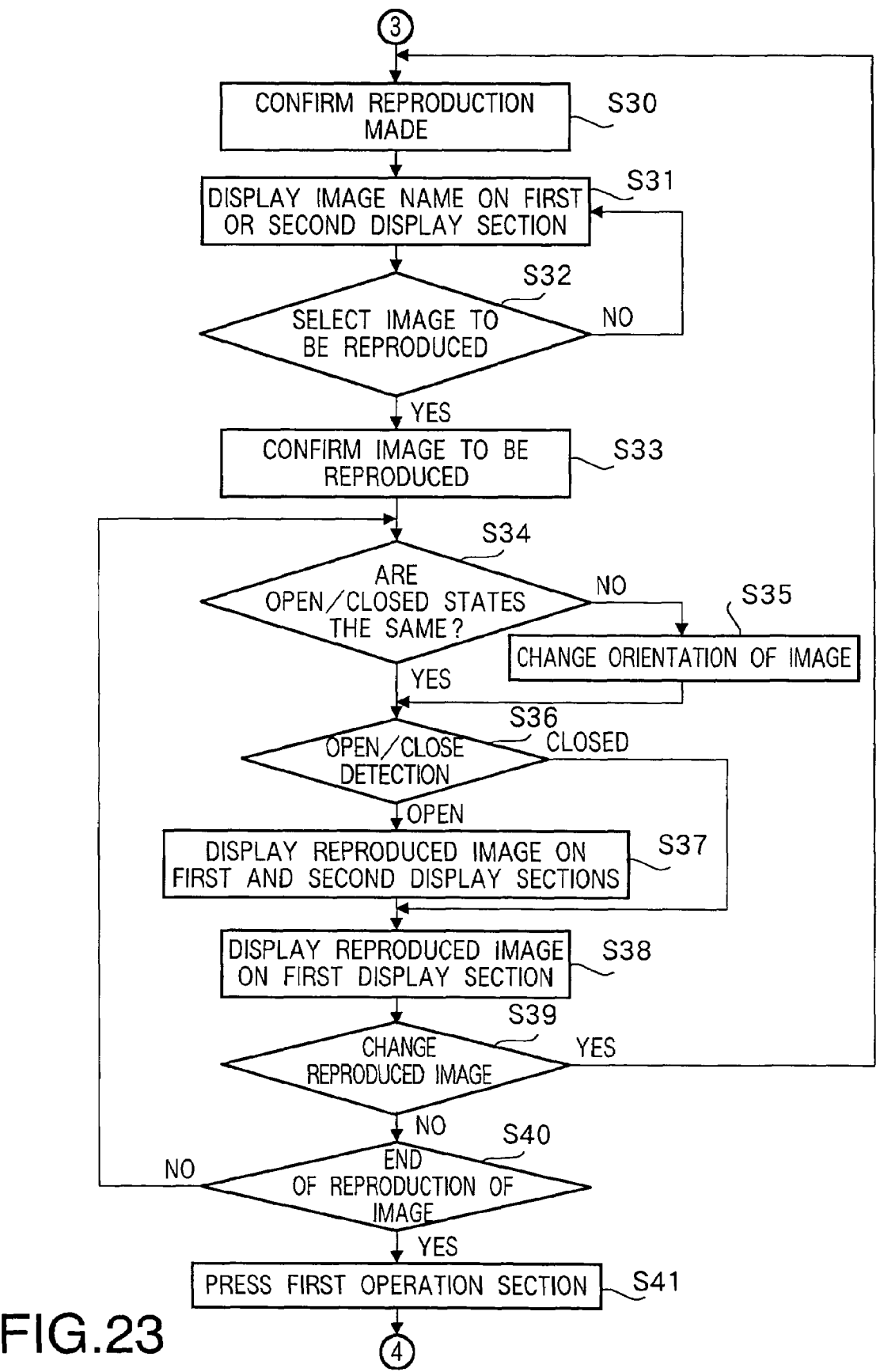
FIG. 23 is a flow chart to illustrate a procedure to reproduce/display the captured image on the display section.

FIG. 21 to FIG. 23 are flow charts to illustrate the operation of the cellular phone terminal in the camera mode.

Figure 24:
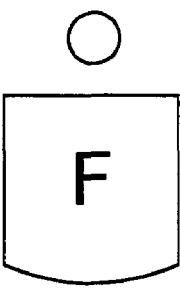
FIG. 24 illustrates an example of an image displayed on each display section when images of characters "F" and "J" are taken by the portable terminal of the present invention (FIG. 19A)
Figure 25:
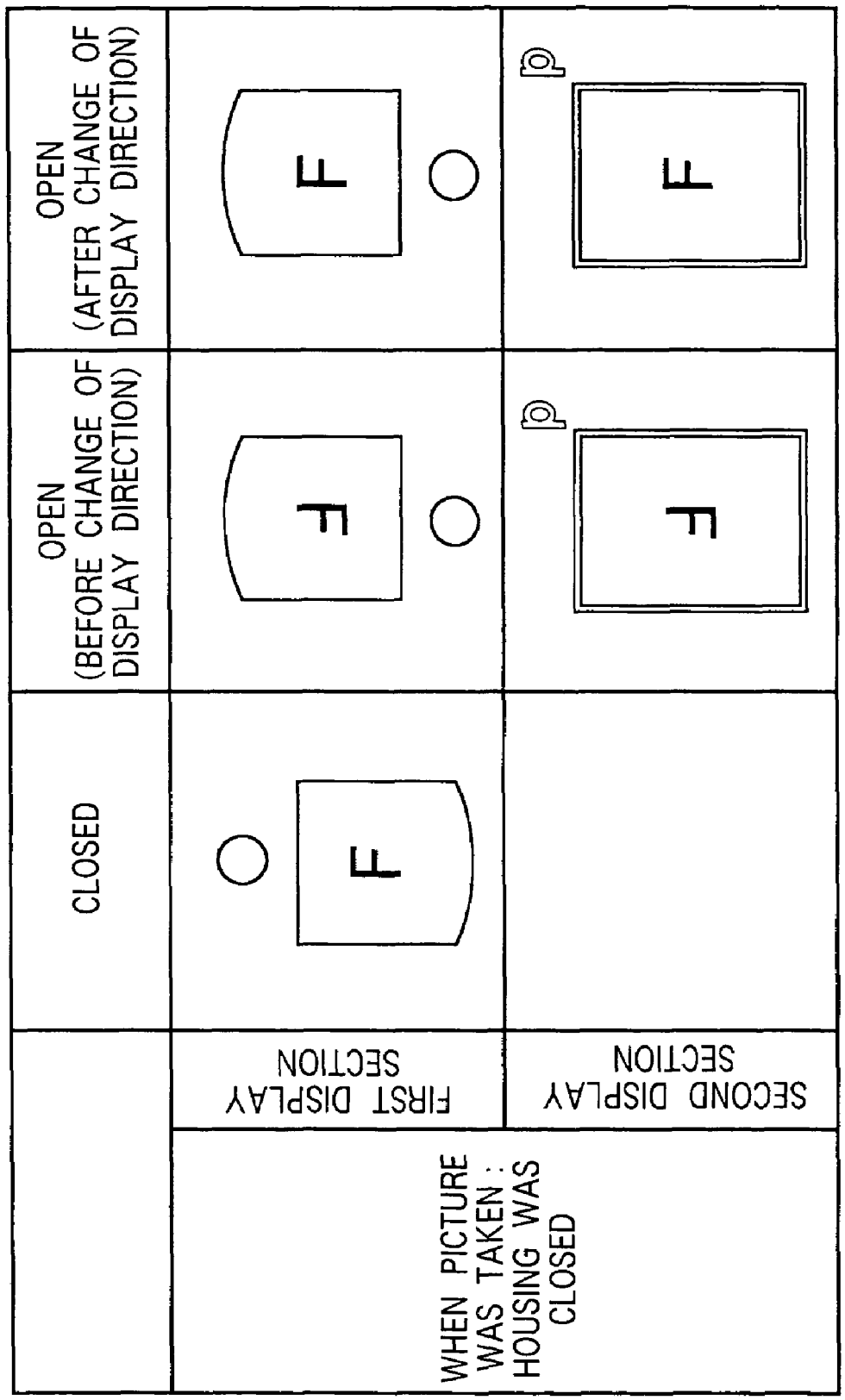
FIG. 25 illustrates an example of an image displayed on each display section when the image taken with the housing folded (FIG. 19A) is reproduced.
Figure 26:
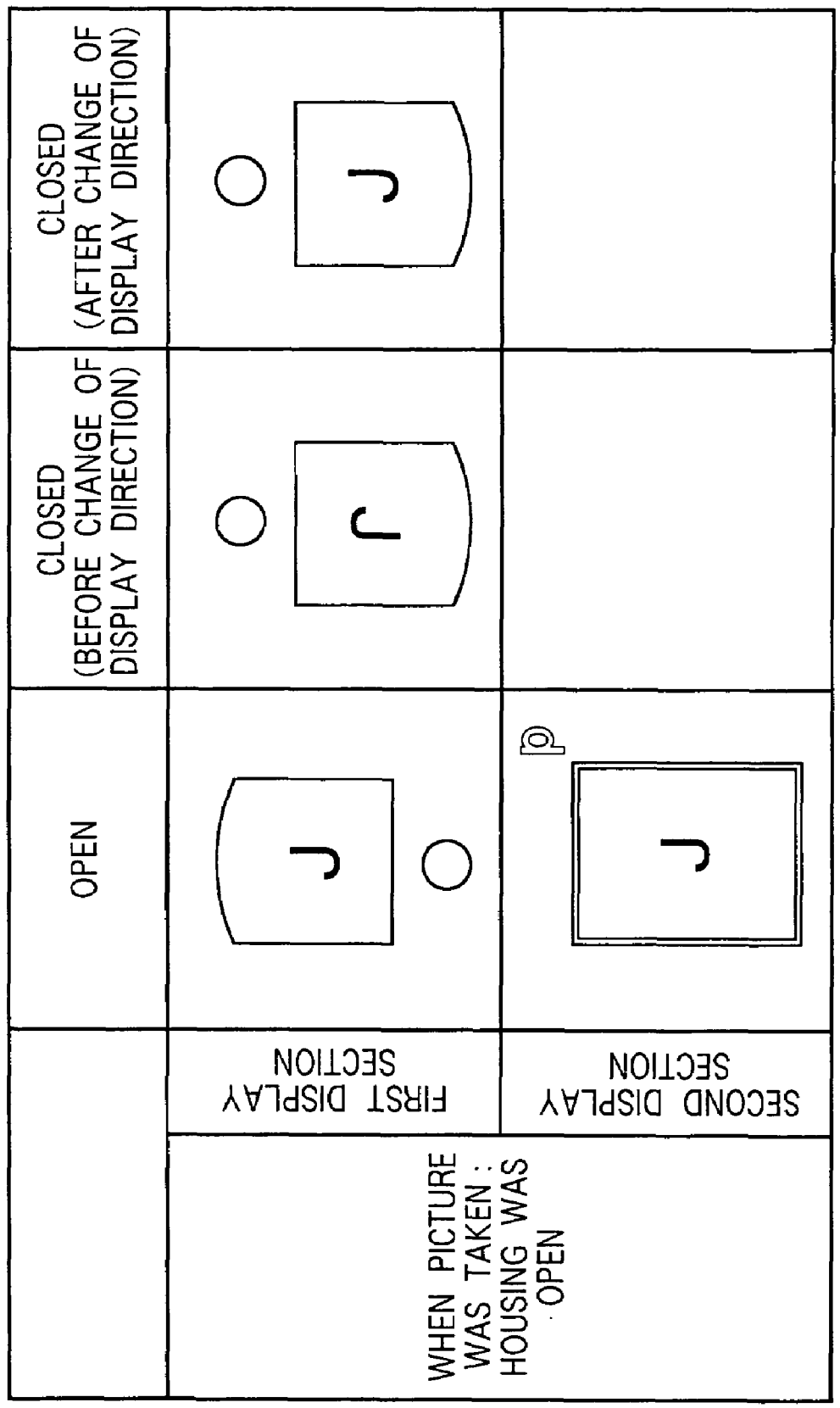
FIG. 26 illustrates an image displayed on each display section when the image taken with the housing not folded (FIG. 19B, FIG. 19C) is reproduced.

Furthermore, FIG. 24 to FIG. 26 show the display sections shown on the display sections 7 and 11 in the situations shown in FIG. 19A to FIG. 19C. That is, in FIG. 19A to FIG. 19C, character F (object 100*a*) exists on the first display section 7 side and character J (object 100*b*) exists on the second display section 11 side. Then, when pictures of these characters "F" and "J" are taken, FIG. 24 to FIG. 26 show the display sections that appear on the display sections 7 and 11.

While the housing is closed, the user holds the housing so that the hinge section 3 is oriented upward and the first display section 7 of the upper housing 1 is oriented toward the user.

On the other hand, while the housing is open, the user holds by hand the lower housing 2 below the upper housing 1 whose second display section 11 is oriented toward the user.

In FIG. 21, when the power is turned on (referred to as step 1 and hereinafter each step will be expressed as "S"), the system is set in a reception waiting state (S2).

Then, to start picture taking using the camera section 8 (to select the camera mode), pressing the first operation section 9 continuously for a predetermined time (long pressing) (S3) gets picture taking started (S4).

At this time, the open/closed state of the housing 4 is detected (S5), and the housing it is open, the image taken is displayed on the first display section 7 and second display section 11 (S6, S7). If the housing is closed, the image taken is displayed only on the first display section 7 (S7). The display section at this time is shown in FIG. 24.

FIG. 24 shows the display sections which appear on the first and second display sections 7 and 11 when a picture of character F or character J in FIG. 19A is taken. That is, while the housing is closed, a picture of character F is taken and the captured image of character F is displayed on the first display section.

While the housing is open, a picture of character J is taken and the captured image of character J is displayed on the first display section 7 and second display section 11.

When the captured image is recorded, further pressing the first operation section 9 once (S8) changes the mode to the one in which the captured image can be recorded (to ①).

Further, pressing the first operation section 9 once (S9) allows the image recorded in the recording section to be displayed on the first or second display section 7, 11 (to ③).

Further, pressing the first operation section 9 once (S10) causes the camera section 8 to restart picture taking and pressing it for a predetermined time (S11) ends picture taking (S12) and sets a reception waiting state (S13).

Then, the case where the captured image is recorded will be explained using FIG. 22.

The first operation section 9 is pressed to set a recordable state (S8), then the third operation section 17 is pressed to confirm the recording mode (S14). This determines whether the image to be recorded is a moving image or still image.

To perform this setting operation, the fourth operation section 18 is pressed once (S15). This operation changes the mode from the moving image capturing mode to the still image capturing mode (S17) Pressing the fourth operation section 18 once again (S15) changes the mode to the moving image mode (S16). Thus, for the image to be recorded, the moving image mode or still image mode is selected every time the fourth operation section 18 is pressed (S15).

Then, it is detected whether the housing 4 is open or not (S18).

If the housing 4 is open, the captured image is displayed on the first display section 7 and second display section 11. Furthermore, to notify that the image to be recorded (image capturing mode) is a moving image, a character "moving image" is displayed (S19, 20).

If the housing 4 is closed, the captured image and character "moving image" are displayed only on the first display section 7 (S20).

When the still image is set, a character "still image" is displayed.

If the third operation section 17 is pressed (S21) while "moving image" is displayed, recording is started (S22). Until the third operation section 17 is operated again (S25), recording (S24) of the moving image is continued and the captured image is recorded in the recording section (S23). Information indicating the open/closed state of the housing 4 is added to the recorded image at the same time.

Furthermore, if the third operation section 17 is pressed (S21) while "still image" is displayed, a still image is recorded in the recording section (S23). In this case, the third operation section 17 is operated as a shutter release button.

Then, it is decided whether a moving image is being captured or not (S24). When the moving image is not being captured, recording ends (S28). When the moving image is being captured, pressing the third operation section (S25) ends the recording (S26).

When the recording ends, a name is assigned to the captured image (S27).

For example, images recorded as moving images are assigned names such as MV1, MV2, . . . Images recorded as still images are assigned names such as PHOTO1, PHOTO2, . . . (S27).

When no more image is captured (S28), the user presses the first operation section 9 (S29).

Next, a case where a captured image is reproduced and displayed on the display section will be explained using FIG. 23.

The first operation section 9 is pressed to allow the recorded image to be reproduced (S9). Then, the third operation section 17 is pressed to confirm the reproduction mode (S30).

On the first display section 7 and second display section 11, the name of the image recorded in the recording section are displayed (S31).

Then, the fourth operation section 18 is operated to change image names which are displayed sequentially (S32) and select the name of the image to be reproduced.

Then, the third operation section 17 is operated. The name of the image displayed is confirmed for the recorded image to be reproduced (S33).

Then, it is decided whether the open/closed state of the housing at the time of picture taking is the same as the current open/closed state of the housing or not (S34). If it is different, the orientation of the image to be reproduced is changed so as to fit the current open/closed state of the housing (S35).

Then, it is detected whether the housing 4 is open or not (S36). If it is open, the recorded image is reproduced on the first and second display sections 7 and 11 (S37).

If it is closed, the reproduced image is displayed on the first display section (S38).

If the next reproduced image is not displayed (S39) the image reproduction processing is completed (S40). Then, the first operation section is pressed (S41).

The operation when the reproduced image is displayed on the first and second display sections 7 and 11 will be explained using FIG. 24 to FIG. 26 below.

FIG. 25 shows an image which was recorded with the housing closed and then reproduced and displayed on the display.

When the housing 4 is closed, the image is displayed on the first display section 7 with the same orientation as that in FIG. 24, that is, in the same way as when the image was taken.

Suppose the reproduced image is displayed on the first and second display sections 7 and 11 while the housing 4 is open. The reproduced image in this case is flipped vertically and horizontally compared to the image at the time of recording. To prevent this, the image is flipped vertically and horizontally (or turned 180°) and displayed.

Furthermore, FIG. 26 shows an image recorded with the housing left open, then reproduced and displayed on the display.

When the housing 4 is open, the image is displayed on the first display section 7 and second display section 11 with the same orientation as that shown in FIG. 24, that is, in the same state as that at the time of picture taking.

When the housing 4 is closed, the second display section 11 is hidden. The first display section 7 continues to be exposed.

When the reproduced image is displayed on the display without any processing, the recorded image is displayed vertically and horizontally reversed. To prevent this, this embodiment displays the image by flipping it vertically and horizontally (or rotating it 180°).

That is, when the state of the housing when the recorded image is read from the storage section and reproduced and displayed on the display section is different from the state (open/closed state) of the housing when the image was recorded, this embodiment flips the recorded image vertically or horizontally, changes the image to a visually adequate image and displays it on the display.

Therefore, the person who views the image need not turn the device the other way round. That is, a normal image (visually adequate image) is always displayed on a desired display.

Then, another example of use will be explained.

When taking a picture with the housing closed, the user holds the housing 4 by hand and directs the camera section 8 toward a desired direction, and can thereby take a picture in the direction the camera section 8 is oriented.

When taking a picture of the user himself/herself, if the housing is closed, the user can take a picture by directing the camera section 7 toward the user himself/herself.

At that time, it is possible to check how the image of the user himself/herself appears by viewing the first display section 7.

Then, pressing the third and fourth operation sections 17 and 18 causes the image displayed on the first display section 7 to be recorded as a moving image or still image.

Furthermore, when the user takes a picture of scenery or a person ahead of the user himself/herself with the housing 4 left open, the user directs the camera section 7 forward, and can thereby take the picture.

In addition, the user can check the captured image by viewing the second display section 11 facing the user himself/herself.

The person who gets his/her picture taken can check the own image with the first display section 7. That is, both the user of the cellular phone terminal and the person who gets his/her picture taken can check how the captured image appears.

Furthermore, when a recorded image is reproduced and displayed, even if the housing is closed, the reproduced image displayed on the first display section 7 appears to the viewer as a normal image. Even if the housing is open, the images displayed on the first display section 7 and second display section 11 are like wise normal images to the viewer.

Furthermore, the present invention allows the telephone directory function to have a still image associated. The telephone directory function is the function of registering telephone number information which is created by associating names with telephone numbers and still images in the storage section and searching for it.

If a telephone number identical to the sender's telephone number is registered in the memory, the first display section 7 and second display section 11 display the sender's telephone number and information such as the name and image associated with this telephone number.

This will be explained using FIG. 27, FIG. 28 and FIG. 29 below.

Figure 27:
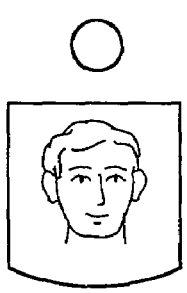
FIG. 27 illustrates an image displayed on each display section when a picture of the face of a man or woman is taken when the housing is folded.
Figure 27:
Figure 27:
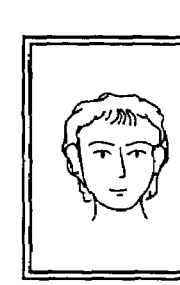

In FIG. 27, when a picture of a man's (name: Taro Matsushita) face is taken and recorded (still image) with the housing closed, a still image is displayed only on the first display section 7.

Furthermore, a picture of a woman (name: Naoko Sugiyama) is taken and recorded (still image) with the housing left open, a still image is displayed on the first display section 7 and second display section 11. These still images can be associated with the name and telephone number and recorded (registered) in a telephone directory memory.

Here, explanations of the method of registering data in the telephone directory memory will be omitted.

Then, a case where a call sent from a person having a telephone number registered in the telephone directory memory arrives at the cellular phone terminal will be explained.

A case where the sender is Mr. Taro Matsushita will be explained using FIG. 28.

Figure 28:
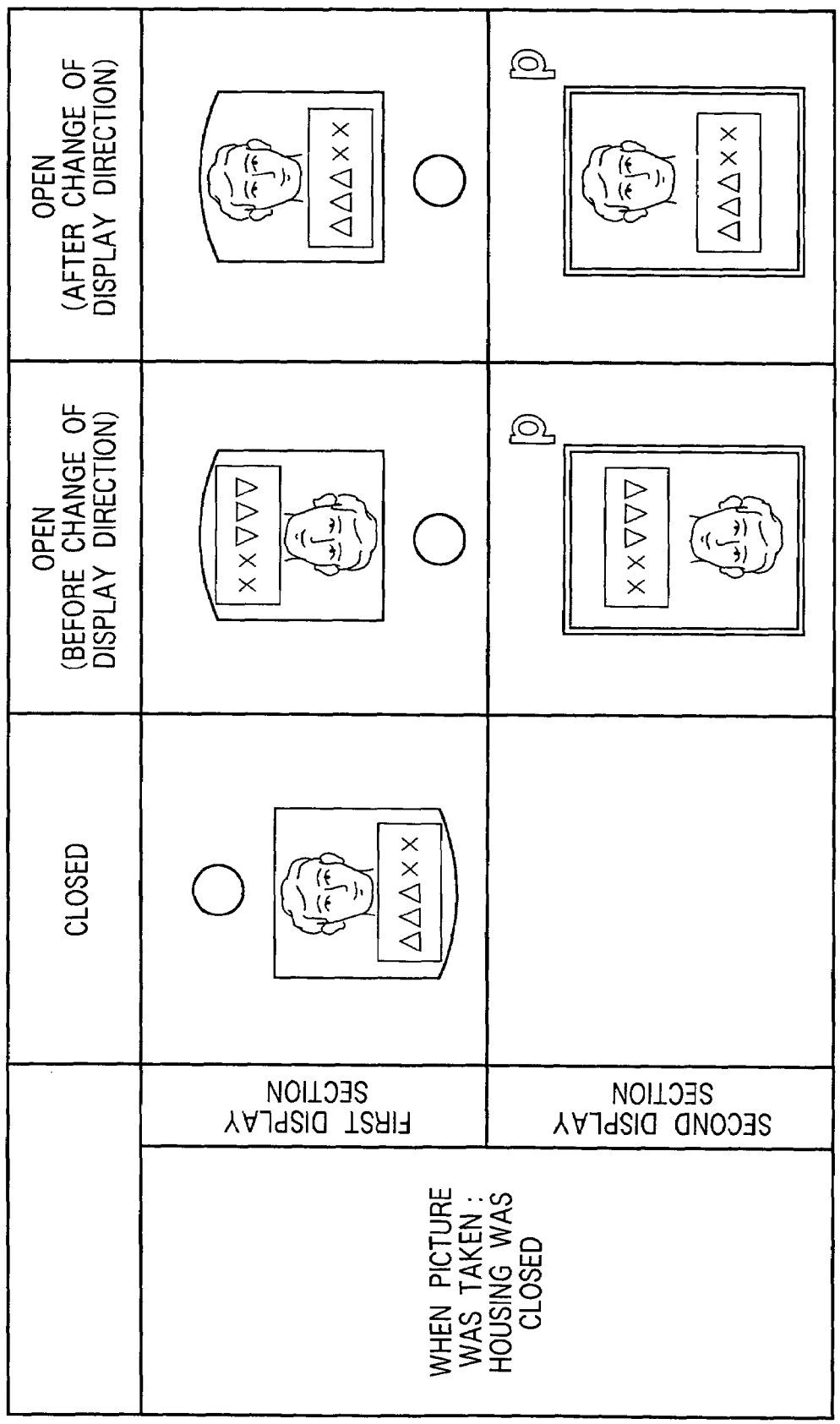
FIG. 28 illustrates how an image appears on each display section when an image taken with the housing folded is reproduced.

FIG. 28 illustrates how the display section appears when a call arrives at the folding type cellular phone set of the present invention.

While the housing 4 is closed, the name and his telephone number of Mr. Taro Matsushita together with his portrait are displayed on the first display section 7.

At this time, since the housing 4 is in the same state (closed) as that when a still image is taken, the portrait is displayed in the same direction as the direction in which the picture was displayed at the time of picture taking.

When the call arrives while the housing 4 is open, the name and telephone number of Mr. Taro Matsushita together with his portrait are displayed on the first display section 7 and second display section 11.

The housing 4 is in a state (open) different from that when the picture was taken and the name, telephone number and portrait are displayed vertically and horizontally reversed.

Then, a case where the sender is Ms. Naoko Sugiyama will be explained using FIG. 29.

Figure 29:
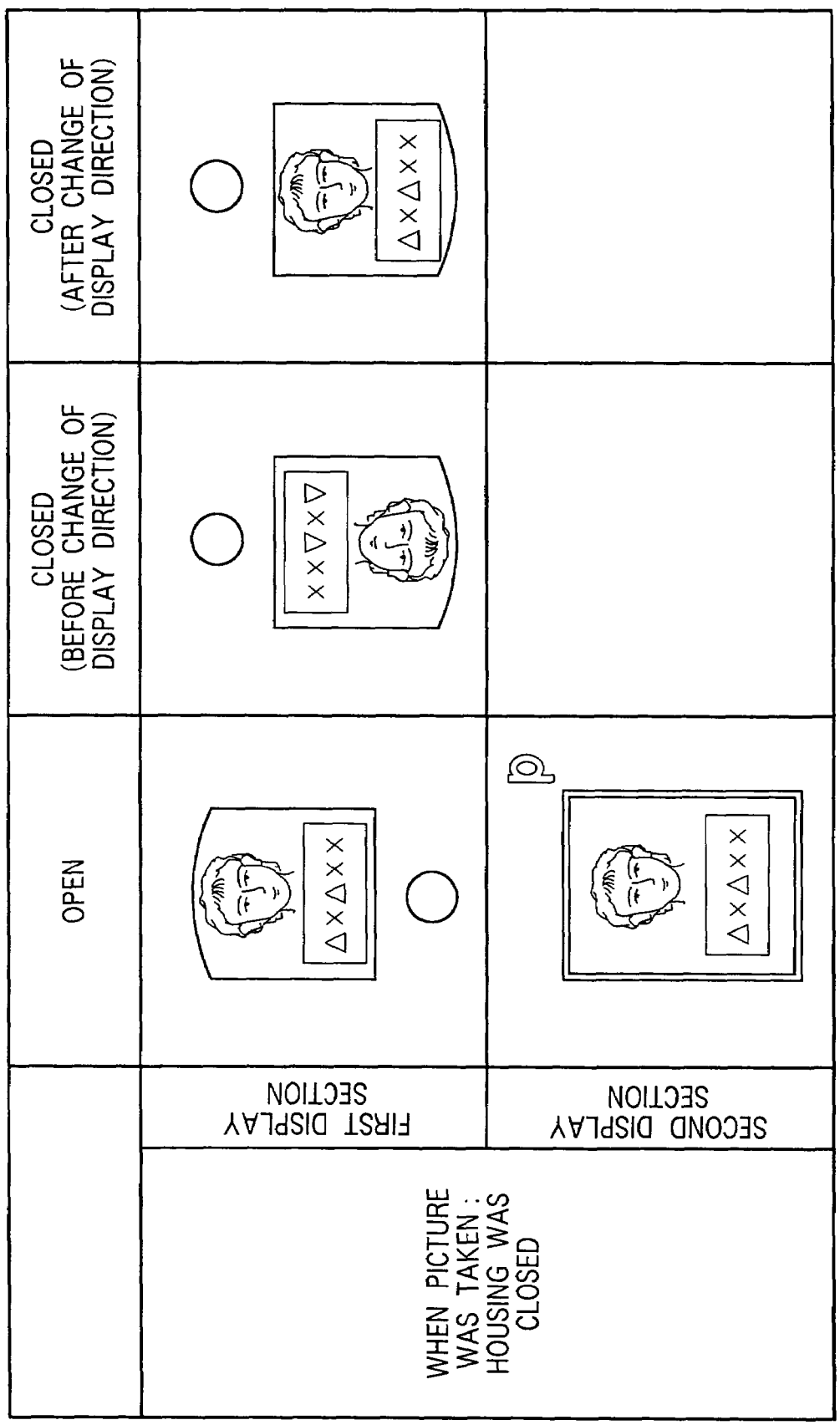
FIG. 29 illustrates an image displayed on each display section when an image taken with the housing not folded is reproduced.

FIG. 29 illustrates how the display section appears when a call arrives at the folding type cellular phone set of the present invention.

While the housing 4 is open, the name and telephone number of Ms. Naoko Sugiyama together with her portrait are displayed on the first display section 7 and second display section 11.

At this time, since the housing 4 is in the same state (open) as that when the image was taken, the portrait is shown in the same direction as the direction in which the picture was displayed at the time of picture taking.

When the call arrives while the housing 4 is closed, the name and telephone number of Ms. Naoko Sugiyama together with her portrait are displayed on the first display section 7.

The housing 4 is in a state (closed) different from that when the picture was taken, and therefore the name, telephone number and portrait are displayed vertically and horizontally reversed.

That is, since the portrait is not displayed vertically and horizontally reversed, whether the call arrives with the housing left open or closed, the first and second display sections 7 and 11 display the still image without being vertically and horizontally reversed. Therefore, the user need not bother to turn the device the other way round, and can identify the sender at a glance.

Next, a case where the display section is used as a mirror will be explained.

Figure 30:
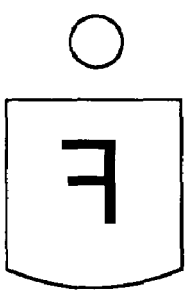
FIG. 30 illustrates an example of an image (mirrored image display) displayed on each display section when characters images of "F" and "J" are taken.

FIG. 30 shows a mirrored image of the image shown in FIG. 24. At this time, the reproduced image shown on the first and second display sections 7 and 11 are the same as those in FIG. 25 and FIG. 26.

In FIG. 30, when the camera section 8 takes a picture of a character ahead, records it with the housing closed, a character F is shown on the first display section 7 as a mirrored image. When the housing is open, the first display section 7 shows a character J as a mirrored image.

The case where a recorded image is reproduced and displayed is the same as that in FIG. 25 and FIG. 26. When the housing 4 is closed (the open/closed state of the housing 4 is the same as that when the picture was taken), the first display section 7 reproduces/displays the image which was displayed on the first display section 7 at the time of recording, by flipping it horizontally.

When the image is reproduced with the housing 4 left open, the open/closed state of the housing 4 is different from that when the picture was taken. In consideration of this, the recorded image is flipped vertically and horizontally to create a reproduced image and the reproduced image is displayed on the display section. Thus, the second display section 11 displays the same image as the reproduced image displayed on the first display section.

Furthermore, while the housing 4 is open (when the open/closed state of the housing 4 is the same as that when the image is recorded), the first display section 7 displays the image which was displayed on the first display section 7 at the time of picture taking and recording, by flipping it horizontally.

The second display section 11 shows the same image as that displayed on the first display section 7 at the time of picture taking and recording.

When the image is reproduced with the housing 4 closed, the open/closed state of the housing 4 is different from that at the time of picture taking. Therefore, a reproduced image is generated with vertical and horizontal positions of the recorded image flipped and the reproduced image is displayed on the display section in this case. The second display section 11 is hidden, and therefore nothing is shown on the second display section.

Thus, even when a mirrored image is displayed on the display, a visually adequate image is always shown on the display irrespective of whether the open/closed state of the housing is different from that at the time of picture taking.

This embodiment allows a reproduced image to be displayed on the first and second display sections while the housing is open, but the user may also reject the idea of the image shown on the first display section being exposed to third parties with the housing left open.

Therefore, when the second operation section is operated and the housing is left open, it is also possible to make a setting so that the reproduced image is not displayed on the first display section.

The present invention can be modified in various ways.

This embodiment has described the case where the camera is placed on the outer surface of the housing to allow picture taking even when the housing is folded, but the camera can also be placed on the inner surface of the housing if pictures are only taken with the housing left open (not folded).

Furthermore, the above-described embodiment has described the case where there is a plurality of displays, but the present invention is also applicable to a case with only one display.

That is, the portable terminal 300 shown in FIG. 31A and 31B have only one display.

That is, the display 11 is provided on the side A which is exposed when the housing is open and no display is provided on the side B opposite the side A unlike the portable terminal shown in FIG. 1B (the side B of the portable terminal shown in FIG. 1B is provided with the display 7).

As shown in FIG. 31C, it is possible to take a picture of a person (man Z) using the camera 8 even if the housing is closed. In this condition, the display 11 is hidden, and so no image is displayed on this display 11.

Next, suppose the housing is open as shown in FIG. 31D. Then, the image of the face of the man Z which has been taken using the camera 8 is shown on the display 11.

Here, suppose a case where the side B is provided with the display 7 as shown in FIG. 1B. As shown at right bottom of FIG. 31D, when a picture of the man Z is taken with the housing closed, a mirrored image of the man Z must be shown on the display 7.

The image of the face of the man Z shown on the display 11 in FIG. 31D is an image obtained by vertically flipping the image that must be displayed on the virtual display 7.

Thus, even if there is only one display, if the recorded image is reproduced and displayed, the orientation (upward or downward, etc.) of the image is automatically adjusted so that it becomes an adequate image to the viewer.

Such control is performed by the control section 30 shown in FIG. 5.

Furthermore, as shown in FIG. 31E, when the housing of the portable terminal 11 is open, it is possible to take a picture of the man Z using the camera 10 and display the image taken on the display 11 in real time.

The image shown at this time is a mirrored image. That is, the image is an adequate one for the man Z to check his own face.

Thus, even when there is only one display, the person who got his/her photo taken can check the own image.

Furthermore, the above-described embodiment has explained an example of a portable terminal whose housing can be folded, but the present invention is not limited to this.

FIG. 32A to FIG. 32D show portable terminals which create a situation with the housing left open by turning the upper housing with respect to the lower housing.

Figure 32A:
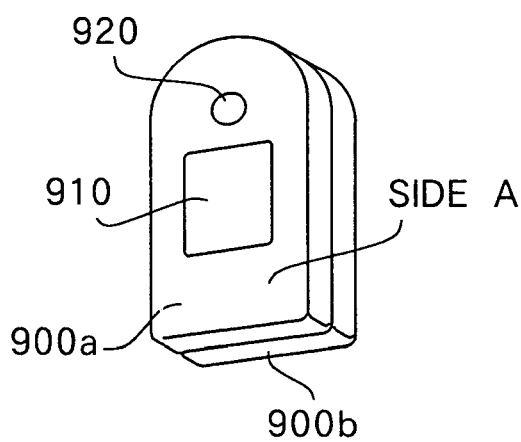
FIG. 32A is a perspective view showing a case where the portable terminal according to the modification example of the present invention is closed.

FIG. 32A shows a situation in which the upper housing 900a exactly overlaps with the lower housing 900b (closed state). Side A of the upper housing 900a is provided with a liquid crystal display 910 and a camera 920.

Figure 32B:
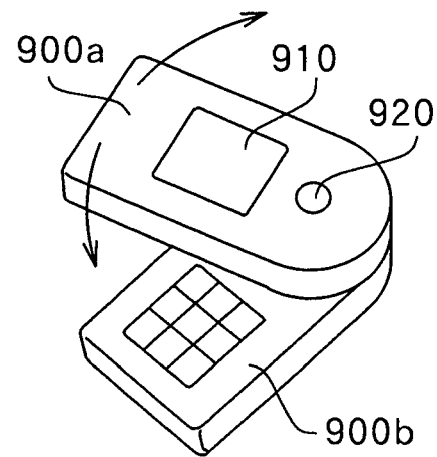
FIG. 32B is a perspective view showing a case where the upper housing of the portable terminal shown in FIG. 32A is rotated with respect to the lower housing.

FIG. 32B shows a situation in which the upper housing 900a has been turned with respect to the lower housing 900b.

Figure 32C:
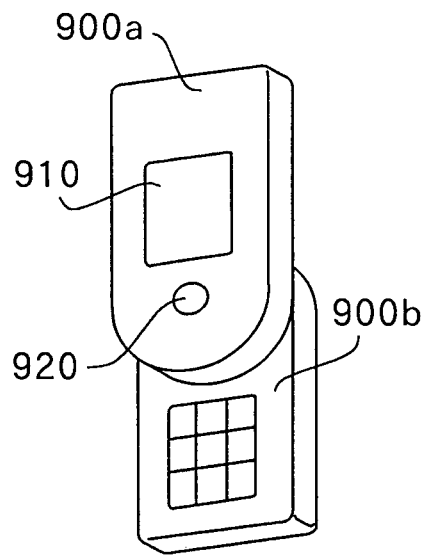
FIG. 32C is a perspective view showing a case where the portable terminal according to the modification example of the present invention is open.

FIG. 32C shows a situation in which the upper housing 900a has been turned 180° (open state).

Figure 32D:
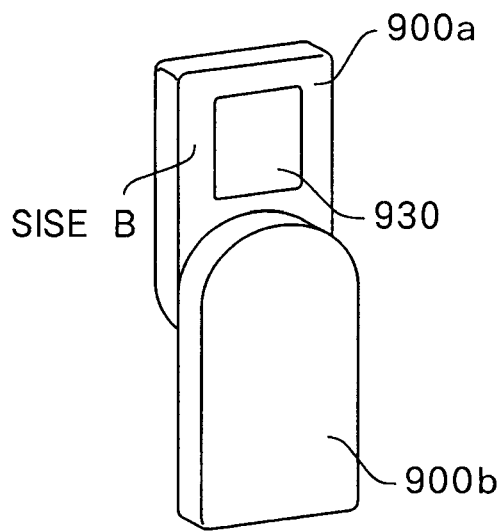
FIG. 32D is a perspective view of the portable terminal shown in FIG. 32 seen from the back.

As shown in FIG. 32D, when the housing is open, the liquid crystal display 930 is exposed on the side B (side opposite the side A) of the upper housing 900a.

The present invention is also applicable to such a portable terminal.

The aforementioned embodiments have described the portable terminal by taking a cellular phone as an example. However, the present invention is not limited to this example. The portable terminal according to the present invention includes PDA (personal digital assistance) and digital camera, etc., in addition to the cellular phone terminal.

As described above, the present invention assumes that a picture of a person (especially portrait) is taken, and the image is recorded in an inner memory and then the image is used repeatedly. In a most preferred example, the recorded image is used to identify a sender of a cellular phone.

The recorded image of a person is closely related to the privacy and dignity of the person. Therefore, it is necessary to prevent any image of the face of the person from being taken secretly or prevent an undesired, inadequate image of the person from being recorded.

Without realizing these measures, it is not possible to use services for displaying images (e.g., portrait of a sender) to identify the sender without anxiety upon arrival of a call at a cellular phone.

Thus, the present invention makes it possible to check whether an image recorded (image concerning a person) is an image appropriate for recording or not using an appropriate image while the image is being taken or after the image is taken.

That is, the present invention provides a portable terminal with a function of checking whether the image used for personal authentication or personal identification is appropriate or not.

When a picture of a person is taken, the present invention allows both the user or person who gets his/her photo taken to see image information taken and created using a camera, and therefore the user or person who gets his/her photo taken can mutually check the captured image.

Furthermore, when a call is received and the telephone number of the sender matches a telephone number stored in an image telephone number storage section, the present invention displays the image information corresponding to the telephone number on a display section, which facilitates the identification of the sender.

Furthermore, the present invention displays an image taken by a camera on the display section when the housing is closed and displays the captured image on both display sections when the housing is open, and can thereby take a picture irrespective of whether the housing is open or closed, and furthermore can show the image without the image being flipped vertically on the display section.

Especially when a picture of a person ahead is taken, both the user and the object (person) can check the captured image.

Furthermore, even when the recorded image is reproduced/displayed on the display section, the image is displayed on the display section without being flipped vertically or horizontally, which provides a visually adequate image at the time of picture taking or reproduction of the image and eliminates the need to turn the device and hold it again.

Furthermore, the present invention can also display a mirrored image, allowing the user to use the portable terminal to check the own appearance as a substitute for a mirror.

Furthermore, when a call arrives from a person, a captured image of whom is associated with a telephone number stored in a telephone directory, the display section shows the image taken in an appropriate direction without flipping the image vertically irrespective of whether the housing is open or closed, which allows the user who sees the image to easily identify the sender.

The present invention allows a person whose picture is taken to check whether the image taken has the quality suitable for use afterwards (e.g., to display the image of the sender's face taken in the past to identify the sender at the time of arrival of a call) or not in real time when the picture is taken.

Then, both at the time of a check and when the sender is displayed, the present invention shows a portrait with correct orientation irrespective of the folded state of the housing, and can thereby check or identify the sender easily. Furthermore, the present invention allows the person who gets his/her photo taken to check the image to be used to display the sender at the time of picture taking, and can thereby eliminate the anxiety about the undesired image from being used as the image to display the sender and use the function of displaying the sender's image without anxiety upon arrival of a call.

This application is based on the Japanese Patent Application No. 2001-334593 filed on Oct. 31, 2001, Japanese Patent Application No. 2002-32263 filed on Feb. 8, 2002 and Japanese Patent Application No. 2002-310119 filed on Oct. 24, 2002, entire content of which is expressly incorporated by reference herein.

INDUSTRIAL APPLICABILITY the present invention is applicable to a cellular phone terminal or PDA (personal digital assistance).

What is claimed is:

1. A portable terminal apparatus comprising:
a camera that is provided on a housing member that opens and closes;
a first display that exposes when the housing member is closed;
a second display that is provided on a back side of the first display and that exposes when the housing member is open;

a telephone directory that associates an image taken by the camera with attribute information and registers the image; and a control section that displays a mirror image of an image on the first display when the image is taken by the camera while the housing member is closed and displays a normal image of the image on the second display when the image is taken while the housing member is open, and that, upon displaying the attribute information, displays a normal image of the image associated with the attribute information on the first display when the housing member is closed and displays said normal image with the attribute information on the second display when the housing member is open.

2. The portable terminal apparatus according to claim 1, wherein the control section turns off the image display on the second display when the housing member is closed.

3. The portable terminal apparatus according to claim 1, wherein the control section enlarges the registered image from a state in which said image was taken and displays the enlarged image on the first or second displays.

* * * * *